US011971836B2

(12) United States Patent
Zhang et al.

(10) Patent No.: US 11,971,836 B2
(45) Date of Patent: Apr. 30, 2024

(54) NETWORK-ON-CHIP DATA PROCESSING METHOD AND DEVICE

(71) Applicant: Shanghai Cambricon Information Technology Co., Ltd., Pudong New Area (CN)

(72) Inventors: Yao Zhang, Pudong New Area (CN); Shaoli Liu, Pudong New Area (CN); Jun Liang, Pudong New Area (CN); Yu Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 0 days.

(21) Appl. No.: 17/564,366

(22) Filed: Dec. 29, 2021

(65) Prior Publication Data

US 2022/0156215 A1 May 19, 2022

Related U.S. Application Data

(63) Continuation of application No. 17/278,812, filed as application No. PCT/CN2019/111977 on Oct. 18, 2019.

(30) Foreign Application Priority Data

Oct. 18, 2018 (CN) .......................... 201811215820.7
Oct. 18, 2018 (CN) .......................... 201811215978.4
(Continued)

(51) Int. Cl.
*G06F 21/85* (2013.01)
*G06F 13/40* (2006.01)
(Continued)

(52) U.S. Cl.
CPC ........... *G06F 13/4068* (2013.01); *G06N 3/04* (2013.01)

(58) Field of Classification Search
None
See application file for complete search history.

(56) References Cited

U.S. PATENT DOCUMENTS

2002/0191595 A1* 12/2002 Mar .................... H04W 84/10
370/401
2009/0128571 A1 5/2009 Smith et al.
(Continued)

FOREIGN PATENT DOCUMENTS

CN 101227486 A 7/2008
CN 102075578 A 5/2011
(Continued)

OTHER PUBLICATIONS

Xu et al., "A Seed-driven Bottom-up Machine Learning Framework for Extracting Relations of Various Complexity", Jun. 2007, Language of Technology Lab, (Year: 2007).*
(Continued)

*Primary Examiner* — Hyun Nam
(74) *Attorney, Agent, or Firm* — Getech Law LLC; Jun Ye

(57) ABSTRACT

The present application relates to a network-on-chip data processing method. The method is applied to a network-on-chip processing system, the network-on-chip processing system is used for executing machine learning calculation, and the network-on-chip processing system comprises a storage device and a calculation device. The method comprises: accessing the storage device in the network-on-chip processing system by means of a first calculation device in the network-on-chip processing system and obtaining first operation data; performing an operation on the first operation data by means of the first calculation device to obtain a
(Continued)

first operation result; and sending the first operation result to a second calculation device in the network-on-chip processing system. According to the method, operation overhead can be reduced and data read/write efficiency can be improved.

17 Claims, 32 Drawing Sheets

(30) Foreign Application Priority Data

| | | | |
|---|---|---|---|
| Oct. 18, 2018 | (CN) | ......................... | 201811216718.9 |
| Oct. 18, 2018 | (CN) | ......................... | 201811216857.1 |
| Nov. 21, 2018 | (CN) | ......................... | 201811390409.3 |
| Nov. 21, 2018 | (CN) | ......................... | 201811390428.6 |
| Nov. 21, 2018 | (CN) | ......................... | 201811392232.0 |
| Nov. 21, 2018 | (CN) | ......................... | 201811392262.1 |
| Nov. 21, 2018 | (CN) | ......................... | 201811392270.6 |
| Nov. 21, 2018 | (CN) | ......................... | 201811392279.7 |
| Nov. 21, 2018 | (CN) | ......................... | 201811393352.2 |

(51) Int. Cl.
  *G06F 30/327* (2020.01)
  *G06N 3/04* (2023.01)

(56) References Cited

U.S. PATENT DOCUMENTS

| | | | | |
|---|---|---|---|---|
| 2009/0271597 | A1* | 10/2009 | Kuesel | G06F 9/30145 |
| | | | | 712/240 |
| 2011/0075596 | A1* | 3/2011 | Moreira | H04W 72/02 |
| | | | | 370/310 |
| 2012/0083338 | A1* | 4/2012 | Decasa | G07F 17/3269 |
| | | | | 463/31 |
| 2012/0303848 | A1* | 11/2012 | Vallapaneni | G06F 13/364 |
| | | | | 710/110 |
| 2012/0303933 | A1* | 11/2012 | Manet | G06F 9/30181 |
| | | | | 712/30 |
| 2014/0156929 | A1* | 6/2014 | Falsafi | G06F 15/7825 |
| | | | | 711/122 |
| 2017/0083338 | A1 | 3/2017 | Burger et al. | |
| 2018/0004518 | A1* | 1/2018 | Plotnikov | G06F 9/30192 |
| 2019/0363717 | A1* | 11/2019 | Swarbrick | G06F 21/85 |
| 2022/0156215 | A1* | 5/2022 | Zhang | G06N 3/084 |

FOREIGN PATENT DOCUMENTS

| | | |
|---|---|---|
| CN | 102591759 A | 7/2012 |
| CN | 102868644 A | 1/2013 |
| CN | 103218208 A | 7/2013 |
| CN | 103580890 A | 2/2014 |
| CN | 105183662 A | 12/2015 |
| CN | 107316078 A | 11/2017 |
| CN | 107578095 A | 1/2018 |
| CN | 107920025 A | 4/2018 |
| CN | 107992329 A | 5/2018 |
| CN | 108427990 A | 8/2018 |
| CN | 108431770 A | 8/2018 |
| CN | 108470009 A | 8/2018 |
| JP | H01179515 A | 7/1989 |
| JP | H04507027 A | 12/1992 |
| JP | H05274455 A | 10/1993 |
| JP | H09120391 A | 5/1997 |
| JP | 2738141 B2 | 4/1998 |
| JP | 2001501755 A | 2/2001 |
| JP | 2006286002 A | 10/2006 |
| JP | 2008301109 A | 12/2008 |
| JP | 2015509183 A | 3/2015 |
| JP | 2018514872 A | 6/2018 |
| KR | 100520807 B1 | 10/2005 |
| KR | 1020100044278 A | 4/2010 |
| KR | 1020100125331 A | 11/2010 |
| KR | 101306354 B1 | 9/2013 |
| KR | 1020160127100 A | 11/2016 |
| KR | 1020170125396 A | 11/2017 |
| WO | 2015087424 A1 | 6/2015 |
| WO | 2017185418 A1 | 11/2017 |
| WO | 2018103736 A1 | 6/2018 |
| WO | 2018126073 A1 | 7/2018 |

OTHER PUBLICATIONS

CN201811216857.1—Chinese Office Action dated Jan. 3, 2023, 22 pages. (With Brief English Explanation).
Ebrahimi et. al., "Cluster-based topologies for 3D Networks-on-Chip using advanced inter-layer bus architecture", Journal of Computer and System Sciences, vol. 79, Issue 4, Jun. 2013, pp. 475-491.
PCT /CN2019/111977—International Search Report and Written Opinion dated Jan. 22, 2020, 13 pages.
EP 19873122.6—Extended European Search Report, dated May 20, 2022, 13 pages.
EP 21217802.4—Extended European Search Report, dated May 3, 2022, 11 pages.
EP 21217809.9—Extended European Search Report, dated May 10, 2022, 11 pages.
EP 21217811.5—Extended European Search Report, dated May 9, 2022, 11 pages.
KR 10-2020-7034133—Notification of Reason for Refusal, dated Jul. 14, 2022, 11 pages.
CN 201811215820.7—First Office Action, dated Aug. 26, 2021, 31 pages. (with English translation).
CN 201811215978.4—First Office Action, dated Aug. 26, 2021, 32 pages. (with English translation).
CN 201811216718.9—First Office Action, dated Aug. 26, 2021, 21 pages. (with English translation).
CN 201811390409.—First Office Action, dated Feb. 20, 2021, 10 pages. (with English translation).
CN 201811392232.0—First Office Action, dated Feb. 10, 2021, 11 pages. (with English translation).
CN 201811392270.6—First Office Action, dated Aug. 18, 2021, 12 pages. (with English translation).
JP 2020206272—Notice of Reasons for Refusal, dated Nov. 24, 2021, 7 pages. (with English translation).
JP 2020206281—Notice of Reasons for Refusal, dated Dec. 9, 2021, 8 pages. (with English translation).
JP 2020206293—Notice of Reasons for Refusal, dated Dec. 9, 2021, 8 pages. (with English translation).
JP 2020206306—Notice of Reasons for Refusal, dated Dec. 9, 2021, 8 pages. (with English translation).
JP 2020569113—Notice of Reasons for Refusal, dated Nov. 24, 2021, 7 pages. (with English translation).
KR 10-2020-7034126—Office Action, dated Jul. 25, 2022, 13 pages.
KR 10-2020-7034138—Office Action, dated Jul. 19, 2022, 15 pages.
KR 10-2020-7034145—Office Action, dated Jul. 25, 2022, 7 pages.
KR 10-2020-7034145—Office Action, dated Jul. 25, 2022, 9 pages. (With brief English explanation).
CN201811216857.1—Second Office Action dated Jun. 1, 2023, 19 pages. (With Brief English Explanation).
KR20207034126—Written Decision on Registration dated May 8, 2023, 6 pages.
KR20207034133—Written Decision on Registration dated May 8, 2023, 6 pages.
KR20207034138—Written Decision on Registration dated May 8, 2023, 6 pages.
KR20207034145—Written Decision on Registration dated May 8, 2023, 6 pages.

* cited by examiner

Primary processing circuit 101
- Conversion processing circuit 110
- Activation processing circuit 111
- Addition processing circuit 112

Fig. 15

NETWORK-ON-CHIP DATA PROCESSING METHOD AND DEVICE

CROSS REFERENCES

This application is a continuation of U.S. patent application Ser. No. 17/278,812, filed Mar. 23, 2021, which is a 371 of International Application PCT/CN2019/111977, filed Oct. 18, 2019, which claims the benefit of priority from Chinese Application No. 201811216718.9 with the title of "Network-On-Chip Processing System and Network-On-Chip Data Processing Method", Chinese Application No. 201811215820.7 with the title of "Network-On-Chip Processing System and Network-On-Chip Data Processing Method", Chinese Application No. 201811215978.4 with the title of "Network-on-Chip Processing System and Network-on-Chip Data Processing Method", and Chinese Application No. 201811216857.1 with the title of "Network-on-Chip Data Processing Method, Storage Medium, Computer Equipment and Device", all of which were filed on Oct. 18, 2018; this application also claims the benefit of priority from Chinese Application No. 201811392232.0 with the title of "Data Processing Method, Device, and Related Product", Chinese Application No. 201811392262.1 with the title of "Data Processing Method, Device, and Related Product", Chinese Application No. 201811392279.7 with the title of "Data Processing Device, Method, and Related Product", Chinese Application No. 201811393352.2 with the title of "Data Processing Device, Method, and Related Product", Chinese Application No. 201811390409.3 with the title of "Data Processing Device, Method, and Related Product", Chinese Application No. 201811390428.6 with the title of "Data Processing Device and Related Product", and Chinese Application No. 201811392270.6 with the title of "Data Processing Device and Related Product", all of which were filed on Nov. 21, 2018. The disclosures of the above applications are incorporated herein by reference in their entirety.

TECHNICAL FIELD

The present disclosure relates to the field of information processing technology, and particularly relates to a network-on-chip data processing method and device.

BACKGROUND

With the development of semi-conductor technology, it has become a reality to integrate hundreds of millions of transistors on a single chip. The network-on-chip (NoC) is capable of integrating plenty of computation resources on a single chip and implementing on-chip communication.

As plenty of computations are required in a neural network, some of the computations, such as a forward operation, a backward operation, and weight update, need to be processed in parallel. In a chip architecture with a large number of transistors, chip design may face problems such as high memory access overhead, high bandwidth blockage, and low data reading/writing efficiency.

SUMMARY

In order to at least overcome the problems existing in the related technology to a certain extent, the present disclosure provides an interaction method, a device, and a smart terminal.

An embodiment of the present disclosure provides a network-on-chip (NoC) processing system. The system includes: a storage device and a plurality of computation devices, where the storage device and the plurality of computation devices are arranged on a same chip. At least one computation device is connected to the storage device, and at least two computation devices are connected to each other.

In an embodiment, any two of the plurality of computation devices are directly connected to each other.

In an embodiment, the plurality of computation devices include a first computation device and a plurality of second computation devices, where the first computation device is connected to the storage device, and at least one of the plurality of second computation devices is connected to the first computation device.

In an embodiment, at least two of the plurality of second computation devices are connected to each other, and are connected to the storage device through the first computation device.

In an embodiment, any two of the plurality of second computation devices are directly connected to the first computation device.

In an embodiment, each of the plurality of computation devices is connected to the storage device, and at least two computation devices are connected to each other.

An embodiment of the present disclosure provides an NoC data processing method, where the method is applied to an NoC processing system. The NoC processing system is used to perform a machine learning operation, and includes a storage device and a computation device. The method includes:
- accessing the storage device in the NoC processing system by using a first computation device in the NoC processing system to obtain first operation data;
- performing an operation on the first operation data by using the first computation device to obtain a first operation result; and
- sending the first operation result to a second computation device in the NoC processing system.

In an embodiment, the computation device includes: an operation unit and a controller unit.

The accessing the storage device in the NoC processing system by using the first computation device in the NoC processing system to obtain first operation data includes:
- obtaining, by the controller unit in the first computation device, the first operation data and a computation instruction from the storage device.

In an embodiment, the operation unit includes: a primary processing circuit and a plurality of secondary processing circuits.

The performing an operation on the first operation data by using the first computation device to obtain a first operation result includes:
- parsing, by the controller unit in the first computation device, the computation instruction to obtain a plurality of operation instructions; and sending, by the controller unit in the first computation device, the plurality of operation instructions and the first operation data to the primary processing circuit in the first computation device;
- performing preorder processing on the first operation data by using the primary processing circuit in the first computation device, and sending data and operation instructions among the plurality of secondary processing circuits in the first computation device;

performing, by the plurality of secondary processing circuits in the first computation device, an intermediate operation in parallel according to the operation data and the operation instructions sent from the primary processing circuit in the first computation device to obtain a plurality of intermediate results, and transferring the plurality of intermediate results to the primary processing circuit in the first computation device; and performing, by the primary processing circuit in the first computation device, subsequent processing on the plurality of intermediate results to obtain the first operation result of the computation instruction.

In an embodiment, the sending the first operation result to a second computation device in the NoC processing system includes:

transferring, by the controller unit in the first computation device, the first operation result to the second computation device in the NoC processing system.

In an embodiment, the machine learning computation includes: an artificial neural network operation; the first operation data includes: input neuron data and weight data; and the first operation result is output neuron data.

In an embodiment, the computation device further includes: a storage unit and a direct memory access unit. The storage unit includes any combination of a register and a cache, where the cache is configured to store the first operation data; and the register is configured to store a scalar in the first operation data.

In an embodiment, the controller unit includes: an instruction storage unit, an instruction processing unit, and a storage queue unit, where the instruction storage unit is configured to store a computation instruction associated with the artificial neural network operation;

the instruction processing unit is configured to parse the computation instruction to obtain a plurality of operation instructions; and the storage queue unit is configured to store an instruction queue, where the instruction queue includes: a plurality of operation instructions and/or a computation instruction to be executed in an order of the instruction queue.

In an embodiment, the primary processing circuit includes: a dependency processing unit.

The dependency processing unit determines whether there is an association between a first operation instruction and a zeroth operation instruction before the first operation instruction. If there is an association between the first operation instruction and the zeroth operation instruction, the dependency processing unit caches the first operation instruction in the instruction storage unit, and after the zeroth operation instruction is executed, the dependency processing unit fetches the first operation instruction from the instruction storage unit and sends the first operation instruction to the operation unit;

the determining whether there is an association between the first operation instruction and the zeroth operation instruction before the first operation instruction includes:

fetching a first storage address interval of data required in the first operation instruction according to the first operation instruction, fetching a zeroth storage address interval of data required in the zeroth operation instruction according to the zeroth operation instruction; if the first storage address interval and the zeroth storage address interval have an overlapping area, determining that there is an association between the first operation instruction and the zeroth operation instruction; and if the first storage address interval and the zeroth storage address interval do not have an overlapping area, determining that there is no association between the first operation instruction and the zeroth operation instruction.

In an embodiment, the operation unit includes: a tree module which includes a root port and a plurality of branch ports, where the root port is connected to the primary processing circuit, and each of the plurality of branch ports is respectively connected to one of the plurality of secondary processing circuits; and the tree module forwards a data block, a weight, and an operation instruction between the primary processing circuit and the plurality of secondary processing circuits.

In an embodiment, the operation unit further includes one or more branch processing circuits, where each of the branch processing circuits is connected to at least one secondary processing circuit;

the primary processing circuit determines that the input neuron is broadcast data, the weight is distribution data, partitions the distribution data into a plurality of data blocks, and sends at least one of the plurality of data blocks, the broadcast data, and at least one of the plurality of operation instructions to the branch processing circuit;

the branch processing circuit forwards the data blocks, the broadcast data, and the operation instruction between the primary processing circuit and the plurality of secondary processing circuits;

the plurality of secondary processing circuits perform an operation on the received data block and broadcast data according to the operation instruction to obtain an intermediate result, and transfer the intermediate results to the branch processing circuit; and the primary processing circuit performs subsequent processing on the intermediate results sent by the branch processing circuit to obtain a first operation result of the computation instruction, and sends the first operation result of the computation instruction to the controller unit.

In an embodiment, the plurality of secondary processing circuits are distributed in an array; each secondary processing circuit is connected to other adjacent secondary processing circuits, and the primary processing circuit is connected to k of the plurality of secondary processing circuits, where the k secondary processing circuits are: n secondary processing circuits in a first row, n secondary processing circuits in an $m^{th}$ row, and m secondary processing circuits in a first column;

the k secondary processing circuits forward data and instructions between the primary processing circuit and the plurality of secondary processing circuits;

the primary processing circuit determines that the input neuron is broadcast data, the weight is distribution data, partitions the distribution data into a plurality of data blocks, and sends at least one of the plurality of data blocks and at least one of the plurality of operation instructions to the k secondary processing circuits;

the k secondary processing circuits convert data between the primary processing circuit and the plurality of secondary processing circuits;

the plurality of secondary processing circuits perform an operation on the received data block according to the operation instruction to obtain an intermediate result, and transfer the operation result to the k secondary processing circuits; and the primary processing circuit performs subsequent processing on the intermediate results sent by the k secondary processing circuits to obtain a first operation result of the computation instruction, and sends the first operation result of the computation instruction to the controller unit.

In an embodiment, the primary processing circuit combines and sorts the intermediate results sent by the plurality of processing circuits to obtain the first operation result of the computation instruction;

or the primary processing circuit combines, sorts, and activates the intermediate results sent by the plurality of processing circuits to obtain the first operation result of the computation instruction.

In an embodiment, the primary processing circuit includes: one or more of a conversion processing circuit, an activation processing circuit, and an addition processing circuit, where the conversion processing circuit performs preorder processing on the first operation data, which specifically includes: performing conversion between a first data structure and a second data structure on the data or intermediate results received by the primary processing circuit; or performing conversion between a first data type and a second data type on the data or intermediate results received by the primary processing circuit;

the activation processing circuit executes the subsequent processing, which specifically includes performing an activation operation of data in the primary processing circuit; and the addition processing circuit executes the subsequent processing, which specifically includes performing an addition operation or an accumulation operation.

In an embodiment, the secondary processing circuit includes: a multiplication processing circuit, where the multiplication processing circuit performs a multiplication operation on a received data block to obtain a product result.

In an embodiment, the secondary processing circuit further includes: an accumulation processing circuit, where the accumulation processing circuit performs an accumulation operation on the product result to obtain the intermediate result.

In an embodiment, the tree module is an n-ary tree structure, where n is an integer greater than or equal to 2.

In an embodiment, the method further includes: accessing a storage device in the NoC processing system through a second computation device in the NoC processing system to obtain second operation data.

In an embodiment, the method further includes: performing an operation on the second operation data and the first operation result by using a second computation device in the on-chip network processing system to obtain a second operation result.

An embodiment of the present disclosure provides an NoC data processing device configured to perform a machine learning operation. The NoC data processing device includes:

an obtaining module configured to access a storage device in the NoC processing system by using a first computation device in the NoC processing system to obtain first operation data;

an operation module configured to perform an operation on the first operation data by using the first computation device to obtain a first operation result; and a sending module configured to send the first operation result to a second computation device in the NoC processing system.

An embodiment of the present disclosure provides a neural network operation device, where the operation device includes one or more computation devices in the Noc processing system. The neural network operation device is configured to obtain data to be operated and control information from other processing devices, execute a specified machine learning operation, and transfer an execution result to other processing devices through an I/O interface.

When the neural network operation device includes a plurality of the computation devices, the plurality of computation devices may be interconnected and transfer data to each other through a specific structure, where the plurality of computation devices are interconnected and transfer data to each other through a PCIE bus to support a larger-scale machine learning operation; the plurality of computation devices share a same control system or have respective control systems; the plurality of computation devices share a memory or have respective memories; and an interconnection mode of the plurality of computation devices is any interconnection topology.

An embodiment of the present disclosure provides a combined processing device, where the combined processing device includes the neural network operation device, a universal interconnection interface, and other processing devices. The neural network operation device interacts with the other processing devices to jointly complete operations specified by a user. The combined processing device may also include a storage device, where the storage device is connected to the neural network operation device and the other processing devices respectively, and the storage device is configured to store data of the neural network computation device and the other processing devices.

An embodiment of the present disclosure provides a neural network chip, where the chip includes the computation device in the NoC processing system, the neural network computation device, or the combined processing device.

An embodiment of the present disclosure provides a neural network chip package structure, where the package structure includes the neural network chip.

An embodiment of the present disclosure provides a board card, where the board card includes the neural network chip package structure.

An embodiment of the present disclosure provides an electronic device, where the electronic device includes the neural network chip or the board card.

It should be understood that the above general descriptions and the following detailed descriptions are only exemplary and illustrative, and are not intended to limit the present disclosure.

BRIEF DESCRIPTION OF THE DRAWINGS

The accompanied drawings herein are incorporated into the specification and constitute a part of the specification, illustrate embodiments that conform to the present disclosure, and are used together with the specification to explain principles of the present disclosure.

FIG. 15 is a schematic structural diagram of a primary processing circuit according to an embodiment;

DETAILED DESCRIPTION OF THE EMBODIMENTS

Figure 1:
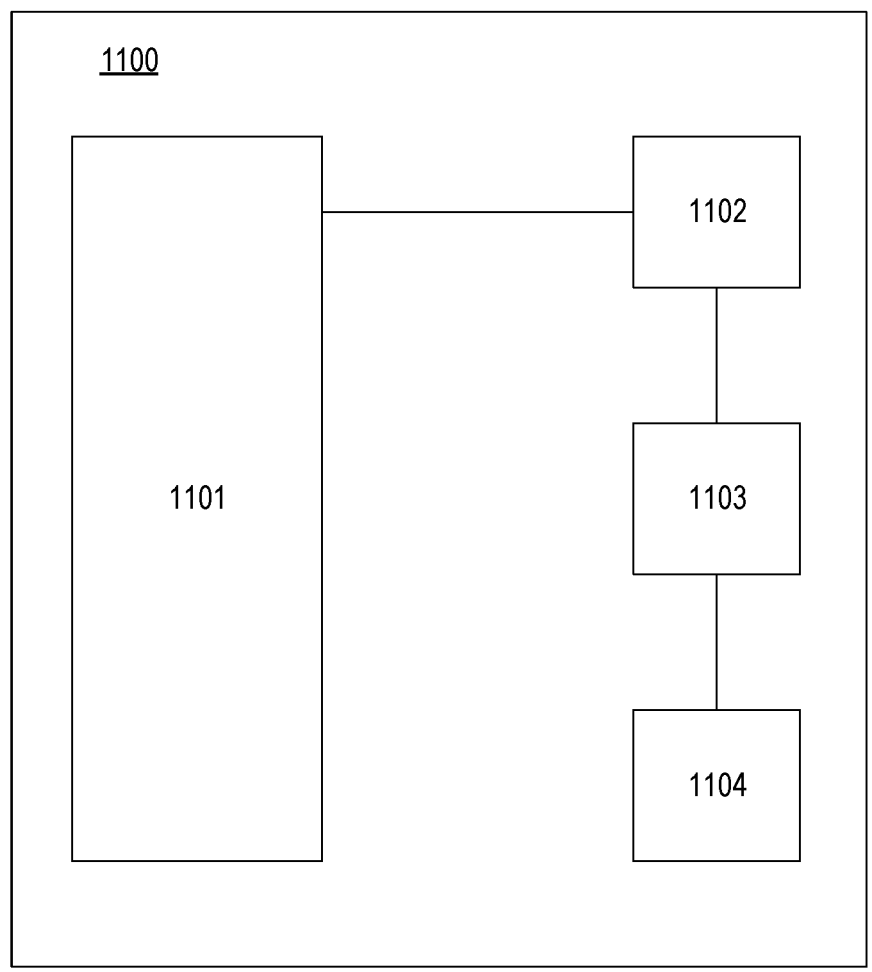
FIG. 1 is a schematic structural diagram of a network-on-chip (NoC) processing system 1100 according to an embodiment.

The exemplary embodiments will be described in detail, and examples thereof are shown in the accompanied drawings. Unless otherwise indicated, identical numbers in different drawings indicate identical or similar elements. The implementation manners described in the following exemplary embodiments do not represent all implementation manners consistent with the present disclosure. On the contrary, the implementation manners are only examples of devices and methods which are consistent with some aspects of the present disclosure and specifically described in the appended claims.

In an embodiment, the present disclosure provides a network-on-chip (NoC) processing system. The system includes a storage device and a plurality of computation devices, where the storage device and the plurality of computation devices are arranged on a same chip, at least one computation device is connected to the storage device, and at least two computation devices are connected to each other.

Network-on-chip (NoC) refers to an on-chip communication network that integrates a large amount of computation resources and connects these resources on a single chip. Optionally, each computation device in the chip can use its own interface to access the NoC, and communicate with a target module to be communicated by using shared network resources. The storage device and the plurality of computation devices are arranged on the same chip, which specifically means that the storage device and the plurality of computation devices are integrated on the same chip. Processor cores in the computation device are connected to an off-chip storage device through NoC, and NoC also supports communication among a plurality of processor cores.

NoC processing systems in the embodiments of the present disclosure are all based on NoC to implement on-chip communication. In addition, the NoC processing systems in the embodiment of the present disclosure can perform both on-chip storage and off-chip storage. In other words, operation data during processing of a neural network processor can be stored in an on-chip storage device or an off-chip storage device. Due to limited on-chip storage capacity of an NoC processing system, operation data and intermediate results generated during an operation process can be temporarily stored in an off-chip storage device, and then be read from the off-chip storage device into NoC when needed. In the embodiments of the present disclosure, the storage devices in the NoC processing system all refer to on-chip storage devices; the computation device in the NoC processing system includes a neural network processor.

In an embodiment, the present disclosure also provides an NoC processing system. The system includes a storage device and a plurality of computation devices, where the plurality of computation devices include a first computation device and a plurality of second computation devices. The storage device and the plurality of computation devices are arranged on a same chip, where the first computation device is connected to the storage device, and at least one of the plurality of second computation devices is connected to the first computation device.

In an embodiment, a neural network chip is provided. The chip includes a storage device, a plurality of computation devices, a first interconnection device, and a second interconnection device, where at least one computation device is connected to the storage device through the first interconnection device, and the plurality of computation devices are connected to each other through the second interconnection device. Further, the computation device may implement a read/write operation on the storage device through the first interconnection device, and a plurality of computation devices may also perform data transfer through the second interconnection device.

The NoC processing system and a neural network chip are respectively described below.

As shown in FIG. 1, FIG. 1 is an NoC processing system 1100 provided by one of the embodiments. The NoC processing system 1100 includes: a storage device 1101, a first computation device 1102, a second computation device 1103, and a second computation device 1104, where the storage device 1101, the first computation device 1102, the second computation device 1103, and the second computation device 1104 are arranged on a same chip of the NoC processing system 1100. The first computation device 1102 is connected to the storage device 1101, the second computation device 1103 is connected to the first computation device 1102, and the second computation device 1103 is also connected to the second computation device 1104. Only the first computation device 1102 can access the storage device 1101, in other words, only the first computation device 1102 can read/write data from the storage device 1101. The first computation device 1102, the second computation device 1103, and the second computation device 1104 can transfer data to each other.

Figure 2:
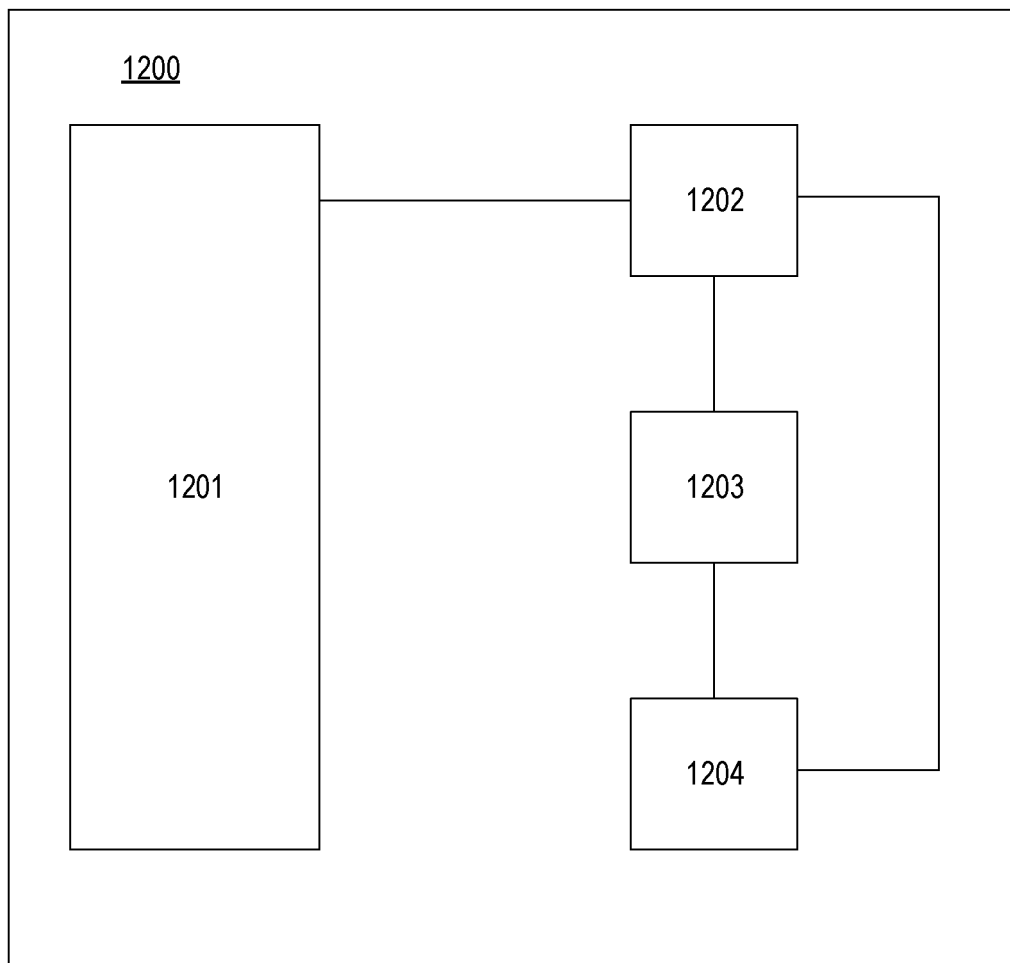
FIG. 2 is a schematic structural diagram of an NoC processing system 1200 according to an embodiment.

Specifically, when the second computation device 1104 needs to read data, the first computation device 1102 accesses the storage device 1101 and reads the data required by the second computation device 1104 from the storage device 1101, the first computation device 1102 sends the data to the second computation device 1103, and the second computation device 1103 sends the data to the second computation device 1104. Optionally, in addition to the first computation device 1102, the second computation device 1103 and the second computation device 1104 can also be connected to the storage device 1101, as long as at least one of the first computation device 1102, the second computation device 1103, and the second computation device 1104 is ensured to be connected to the storage device 1101, which is not specifically limited herein. Optionally, the second computation device 1103 can be connected to the second computation device 1104 or the first computation device 1102, as long as at least two of the first computation device 1102, the second computation device 1103, and the second computation device 1104 are ensured to be connected to each other, which is not specifically limited herein. As shown in FIG. 2, FIG. 2 is an NoC processing system 1200 provided by one of the embodiments. The NoC processing system 1200 includes: a storage device 1201, a first computation device 1202, a second computation device 1203, and a second computation device 1204, where the storage device 1201, the first computation device 1202, the second computation device 1203, and the second computation device 1204 are arranged on a same chip of the NoC processing system 1200. The first computation device 1202 is connected to the storage device 1201, and the computation device 1203 and the second computation device 1204 are directly connected to the first computation device 1202. In other words, the second computation device 1204 is connected to both the second computation device 1203 and the first computation device 1201, and does not need to establish a connection with the first computation device 1201 through the second computation device 1203. Only the first computation device 1202 can access the storage device 1201, in other words, only the first computation device 1202 can read/write data from the storage device 1201. The first computation device 1202, the second computation device 1203, and the second computation device 1204 can transfer data to each other.

Specifically, when the second computation device 1204 needs to read data, the first computation device 1202 accesses the storage device 1201 and reads data required by the second computation device 1204 from the storage device 1201, and the first computation device 1202 directly sends the data to the second computation device 1204 with no need for the second computation device 1203 to forward the data first. Optionally, the first computation device 1202, the second computation device 1203, and the second computation device 1204 can all be connected to the storage device 1201, as long as at least one of the first computation device 1202, the second computation device 1203, and the second computation device 1204 are ensured to be connected to the storage device 1201, which is not specifically limited herein. Optionally, the second computation device 1203 can be connected to the second computation device 1204 or the first computation device 1202, as long as at least two of the first computation device 1202, the second computation device 1203, and the second computation device 1204 are ensured to be connected to each other, which is not specifically limited herein.

In the above NoC processing system, by establishing a connection between a plurality of computation devices arranged on a same chip, data can be transferred among a plurality of computation devices, which may avoid excessive connection bandwidth overhead caused by a plurality of computation devices all reading data from the storage device, and improve efficiency of reading and writing data.

In an embodiment, the present disclosure provides an NoC processing system. The system includes: a storage device and a plurality of computation devices, where the storage device and the plurality of computation devices are arranged on a same chip, each of the plurality of computation devices is connected to the storage device, and at least two computation devices are connected to each other.

Figure 3:
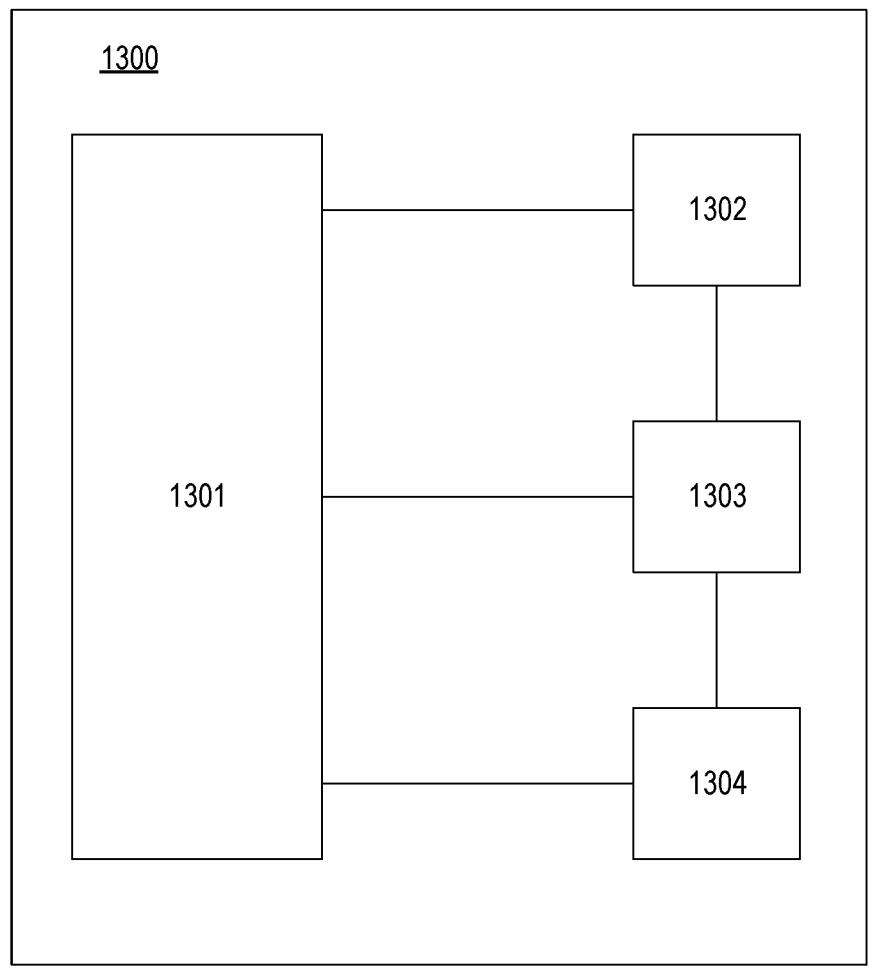
FIG. 3 is a schematic structural diagram of an NoC processing system 1300 according to an embodiment.

As shown in FIG. 3, FIG. 3 is an NoC processing system 1300 provided by one of the embodiments. The NoC processing system 1300 includes a storage device 1301, a computation device 1302, a computation device 1303, and a computation device 1304. The storage device 1301, the computation device 1302, the computation device 1303, and the computation device 1304 are arranged on a same chip of the NoC processing system 1300. The computation device 1302, the computation device 1303, and the computation device 1304 are all connected to the storage device 1301, and the computation device 1302 and the computation device 1303 are connected to each other. At the same time, the computation device 1303 and the computation device 1304 are connected to each other. The computation device 1302, the computation device 1303, and the computation device 1304 can all access the storage device 1201. The computation device 1302 and the computation device 1303 can transfer data to each other, and the computation device 1303 and the computation device 1304 can transfer data to each other.

Specifically, when the computation device 1304 needs to read data, the computation device 1304 can directly access the storage device 1301; or the computation device 1303 can access the storage device 1301 and read data required by the computation device 1304 from the storage device 1301, and then the computation device 1303 sends the data to the computation device 1304; or the computation device 1302 can access the storage device 1301 and read data required by the computation device 1304 from the storage device 1301, the computation device 1302 sends the data to the computation device 1303, and then the computation device 1303 sends the data to the computation device 1304. Optionally, it only needs to be ensured that at least one of the computation device 1302, the computation device 1303, and the computation device 1304 is connected to the storage device 1301, which is not specifically limited herein. Optionally, it only needs to be ensured that at least two of the computation device 1302, the computation device 1303, and the computation device 1304 are connected to each other, which is not specifically limited herein.

In the above NoC processing system on a chip, by establishing a connection among a plurality of computation devices set on a same chip, data required by any computation device can be transferred among a plurality of computation devices. This system may reduce computation devices that simultaneously read a storage device interface, which reduces bandwidth blockage.

Figure 4:
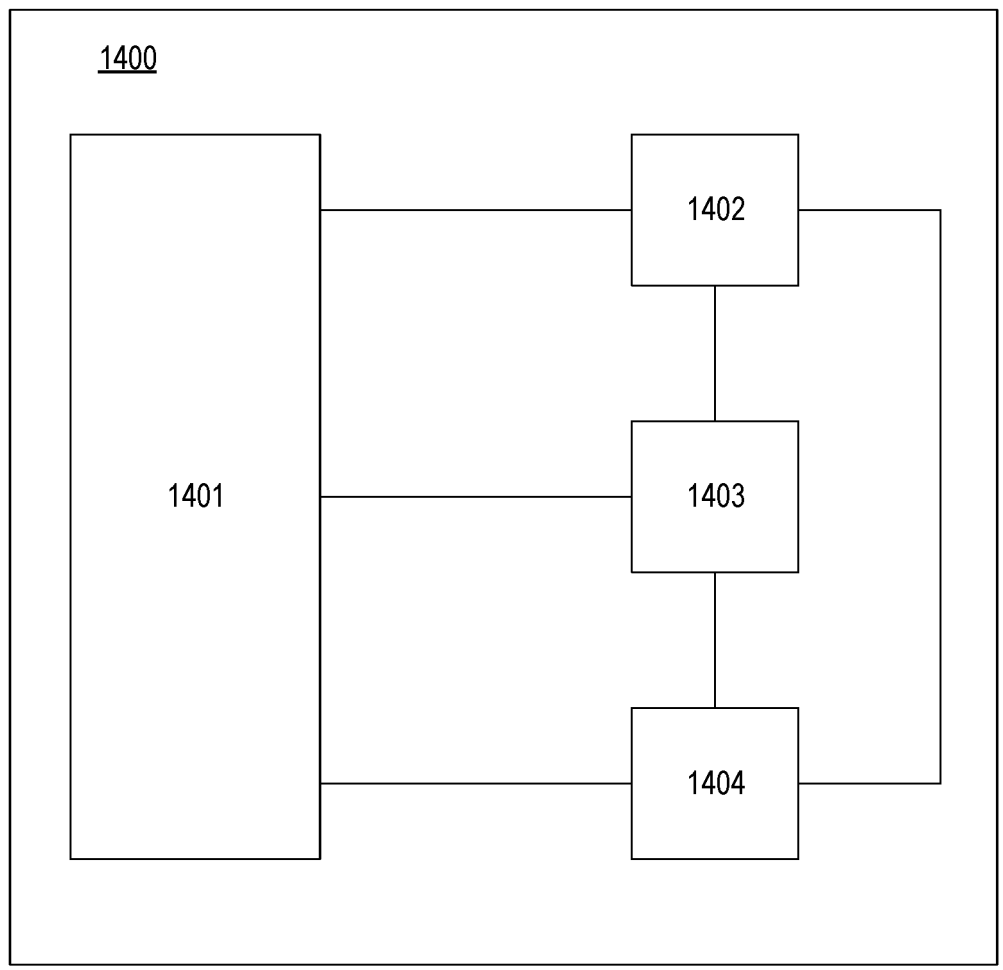
FIG. 4 is a schematic structural diagram of an NoC processing system 1400 according to an embodiment.

As shown in FIG. 4, one of embodiments provides an NoC processing system 1400, where the system includes: a storage device 1401, a computation device 1402, a computation device 1403, and a computation device 1404. The storage device 1401, a computation device 1402, the computation device 1403, and the computation device 1404 are arranged on a same chip of the NoC processing system 1400. The computation device 1402, the computation device 1403, and the computation device 1404 are all connected to the storage device 1401; and the computation device 1402, the computation device 1403, and the computation device 1404 are connected to each other. The computation device 1402, the computation device 1403, and the computation device 1404 can all access the storage device 1401; and the computation device 1402, the computation device 1403, and the computation device 1404 can transfer data to each other.

Specifically, when the computation device 1404 needs to read data, the computation device 1404 can directly access the storage device 1401; or the computation device 1403 can access the storage device 1401, and data required by the computation device 1404 can be read from the storage device 1401, and the computation device 1403 sends the data to the computation device 1404; the computation device 1402 can also access the storage device 1401, read the data required by the computation device 1404 from the storage device 1401, and the computation device 1402 directly sends the data to the computation device 1404, and there is no need to forward through the computation device 1403. Optionally, it only needs to be ensured that at least one of the computation device 1402, the computation device 1403, and the computation device 1404 is connected to the storage device 1401, which is not specifically limited herein. Optionally, it only needs to be ensured that at least two of the computation device 1402, the computation device 1403, and the computation device 1404 are connected to each other, which is not specifically limited herein.

In the above-mentioned network-on-chip processing system, by establishing a direct connection between the plurality of computation devices arranged on the same chip without using a storage device, data can be directly transferred between the two computation devices, which can improve the efficiency of reading and writing data.

In one embodiment, the present disclosure also provides an NoC processing system. The system includes: a storage device and a plurality of computation device clusters, where the storage device and the plurality of computation device clusters are arranged on the same chip. Each computation device cluster includes a plurality of computation devices, where at least one of the plurality of computation device clusters is connected to the storage device, and at least two computation device clusters are connected to each other.

In one embodiment, a neural network chip is provided. The chip includes a storage device, a plurality of computation device clusters, a first interconnection device, and a second interconnection device, where at least one of the plurality of computation device clusters is connected to the storage device through the first interconnection device, and the plurality of computation device clusters are connected to each other through the second interconnection device. Further, the computation device cluster may perform a read/write operation on the storage device through the first interconnection device, and the plurality of computation device clusters may perform data transfer through the second interconnection device. A plurality of computation devices may be divided into a plurality of clusters, and a count of computation devices in each cluster is not specifically limited. For example, one cluster may include four computation devices.

Figure 5A:
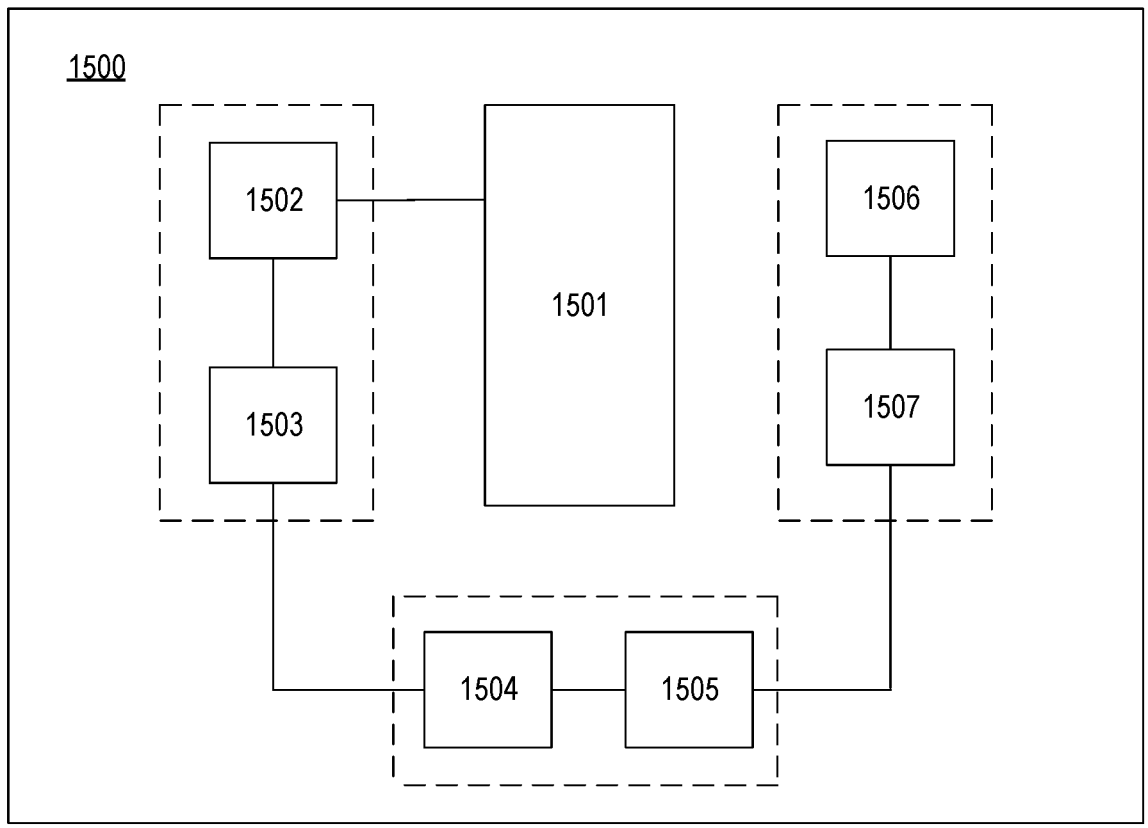
FIG. 5a is a schematic structural diagram of an NoC processing system 1500 according to an embodiment.

As shown in FIG. 5a, one embodiment provides an NoC processing system 1500, where the system includes: a storage device 1501 and six computation devices (computation devices 1502 to 1507). The storage device 1501 and the six computation devices (the computation devices 1502 to 1507) are arranged on a same chip of the NoC processing system 1500. For example, the six computation devices may be divided into three clusters, and each cluster includes two computation devices. For example, the computation device 1502 and the computation device 1503 are designated as a first computation device cluster (cluster1), the computation device 1504 and the computation device 1505 are designated as a second computation device cluster (cluster2), and the computation device 1506 and the computing device 1507 are designated as a third computation device cluster (cluster3), where cluster1 is a primary computation device cluster, and cluster2 and cluster3 are computation device sub-clusters. The storage device 1501 is only connected to cluster1, while cluster1, cluster2, and cluster3 are connected to each other. The computation device 1502 in cluster1 is connected to the storage device 1501, the computation device 1503 in cluster1 is connected to the computation device 1504 in cluster2, and the computation device 1505 in cluster2 is connected to the computation device 1507 in cluster3.

Specifically, when cluster3 needs to read data, cluster1 may access the storage device 1501 and read data required by cluster3 from the storage device 1501, then cluster1 sends the data to cluster2 and cluster2 sends the data to cluster3. A plurality of computation devices may be designated into a plurality of clusters, and a count of computation devices in each cluster is not specifically limited. For example, one cluster may include four computation devices.

Optionally, not all of the plurality of computation devices are required to be connected to the storage device 1501, as long as at least one of the two computation device clusters is connected to the storage device 1501, which is not specifically limited herein. Optionally, cluster1 may be connected to cluster2 or cluster3, as long as at least two of the three computation device clusters are ensured to be connected to each other, which is not specifically limited herein. Optionally, each of the computation device clusters includes at least one computation device connected to at least one computation device in other computing device cluster. In other words, each computation device in cluster1 may be connected to the second device cluster, as long as at least one computation device in cluster1 is connected to at least one computation device in cluster2, which is not specifically limited herein. Optionally, the plurality of computation device clusters are connected to each other through any one of the plurality of computation device clusters. In other words, any computation device in cluster1 may be connected to any computation device in cluster2, which is not limited herein.

Figure 5B:
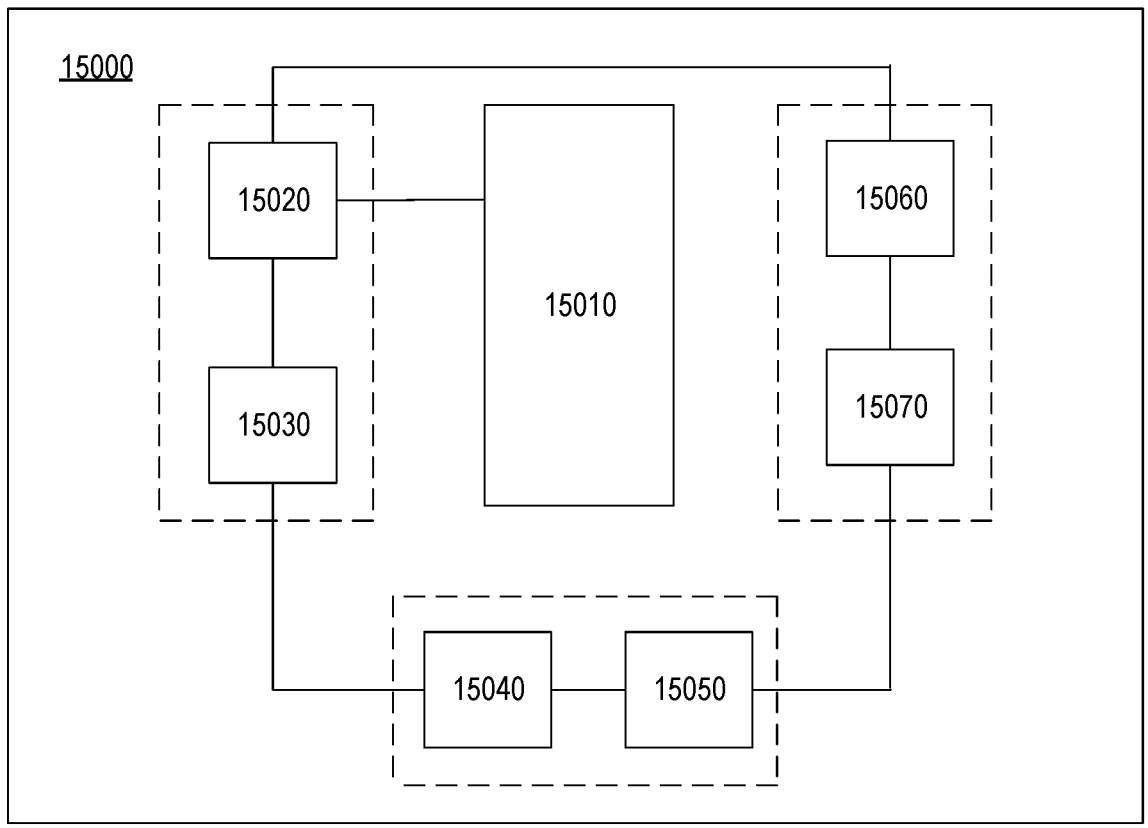
FIG. 5b is a schematic structural diagram of an NoC processing system 15000 according to an embodiment.

As shown in FIG. 5b, one embodiment provides an NoC processing system 15000, where the system includes: a storage device 15010 and six computation devices (computation devices 15020 to 15070). The storage device 15010 and the six computation devices (the computation devices 15020 to 15070) are arranged on a same chip of the NoC processing system 15000. The six computation devices may be divided into three clusters: the computation device 15020 and the computation device 15030 are designated as a first computation device cluster (cluster1), the computation device 15040 and the computation device 15050 are designated as a second computation device cluster (cluster2), and the computation device 15060 and the computing device 15070 are designated as a third computation device cluster (cluster3), where cluster1 is a primary computation device cluster, and cluster2 and cluster3 are computation device sub-clusters. The storage device 15010 is only connected to cluster1, while cluster1, cluster2, and cluster3 are connected to each other. The computation device 15020 in cluster1 is connected to the storage device 15010, the computation device 15030 in cluster1 is connected to the computation device 15040 in cluster2, the computation device 15050 in cluster2 is connected to the computation device 15070 in cluster3, and the computation device 15060 in cluster3 is connected to the computation device 15020 in cluster1.

Specifically, when cluster3 needs to read data, cluster1 may access the storage device 1501 and read data required by cluster3 from the storage device 1501, then cluster1 directly sends the data to cluster3. A plurality of computation devices may be designated into a plurality of clusters, and a count of computation devices in each cluster is not specifically limited. For example, one cluster may include four computation devices.

Optionally, not all of the plurality of computation devices are required to be connected to the storage device 15010, as long as at least one of the two computation device clusters is connected to the storage device 15010, which is not specifically limited herein. Optionally, cluster1 may be connected to cluster2 or cluster3, as long as at least two of the three computation device clusters are ensured to be connected to each other, which is not specifically limited herein. Optionally, each of the computation device clusters includes at least one computation device connected to at least one computation device in other computing device cluster. In other words, each computation device in cluster1 may be connected to the second device cluster, as long as at least one computation device in cluster1 is connected to at least one computation device in cluster2, which is not specifically limited herein. Optionally, the plurality of computation device clusters are connected to each other through any one of the plurality of computation device clusters. In other words, any computation device in cluster1 may be connected to any computation device in cluster2, which is not limited herein.

In the above-mentioned NoC processing system, by establishing a connection between a plurality of computation device clusters arranged on the same chip, inter-cluster communication may be realized among a plurality of computation device clusters. The system may reduce computation devices which simultaneously read interfaces of the storage device through inter-cluster data transfer, which may reduce energy consumption of memory access; at the same time, a plurality of computation devices arranged on the same chip establish inter-cluster communication in a plurality of connection manners, establish a plurality of communication channels among the plurality of computation devices, and select an optimal channel for data transfer according to current network congestion, which may save energy consumption and improve data processing efficiency.

In one embodiment, the present disclosure also provides an NoC processing system. The system includes: a storage device and a plurality of computation device clusters, where the storage device and the plurality of computation device clusters are arranged on a same chip. Each computation device cluster includes a plurality of computation devices, where at least one of the plurality of computation device clusters is connected to the storage device, and the plurality of computation device clusters are connected to each other.

Figure 6:
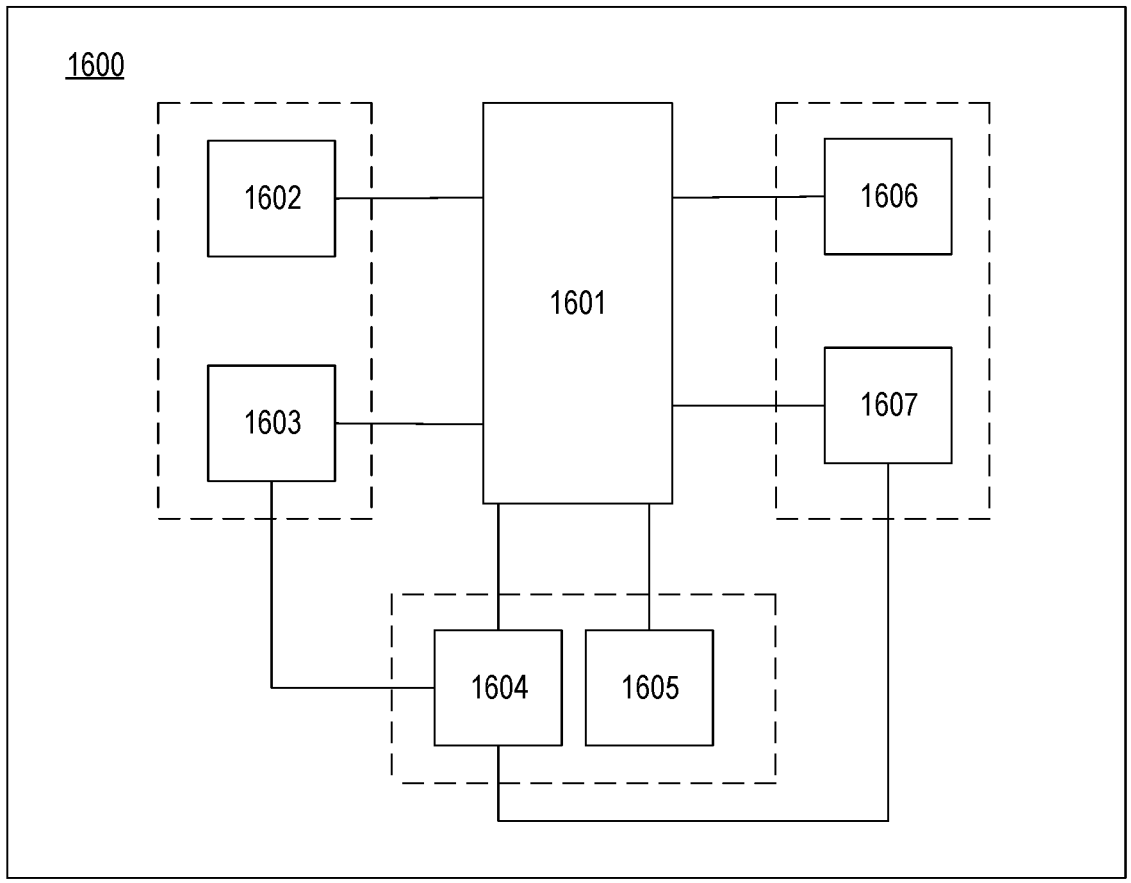
FIG. 6 is a schematic structural diagram of an NoC processing system 1600 according to an embodiment.

As shown in FIG. 6, one embodiment provides an NoC processing system 1600, where the system includes: a storage device 1601 and six computation devices (computation devices 1602 to 1607). The storage device 1601 and the six computation devices (the computation devices 1602 to 1607) are arranged on a same chip of the NoC processing system 1600. For example, the six computation devices may be divided into three clusters: the computation device 1602 and the computation device 1603 are designated as a first computation device cluster (cluster1), the computation device 1604 and the computation device 1605 are designated as a second computation device cluster (cluster2), and the computation device 1606 and the computing device 1607 are designated as a third computation device cluster (cluster3), where cluster1, cluster2, and cluster3 are all connected to the storage device 1601, cluster1 is connected to cluster2, and cluster 2 is connected to cluster3. The computation devices 1602 to 1607 are all connected to the storage device 1601. The computation device 1603 in cluster1 is connected to the computation device 1604 in cluster2, and the computation device 1604 in cluster2 is connected to the computation device 1607 in cluster3.

Specifically, when cluster3 needs to read data, cluster2 may access the storage device 1601 and read data required by cluster3 from the storage device 1601; or cluster1 may access the storage device 1601, read data required by cluster3 from the storage device 1601, and send the data to cluster2, then cluster2 sends the data to cluster3. A plurality of computation devices may be divided into a plurality of clusters, and a count of computation devices in each cluster is not specifically limited. For example, one cluster may include four computation devices.

Optionally, not all of the plurality of computation devices are required to be connected to the storage device 1601, as long as at least one of the two computation device clusters is connected to the storage device 1911, which is not specifically limited herein. Optionally, each computation device in cluster1 may be connected to the second device cluster and/or cluster3, as long as at least one computation device in cluster1 is ensured to be connected to at least one computation device in cluster2 and/or cluster3, which is not specifically limited herein. Optionally, any computation device in cluster1 may be connected to any computation device in cluster2 and/or cluster3, which is not limited herein.

In the above NoC processing system on a chip, by establishing a connection among a plurality of computation device clusters arranged on a same chip, data required by any computation device cluster can be transferred among a plurality of computation device clusters. This system may reduce computation devices that simultaneously read a storage device interface, which reduces bandwidth blockage.

In one embodiment, the present disclosure also provides an NoC processing system. The system includes: a storage device and a plurality of computation device clusters, where the storage device and the plurality of computation device clusters are arranged on a same chip. Each computation device cluster includes a plurality of computation devices, where at least one of the plurality of computation device clusters is connected to the storage device, and any two clusters of the plurality of computation device clusters are connected to each other.

Figure 7:
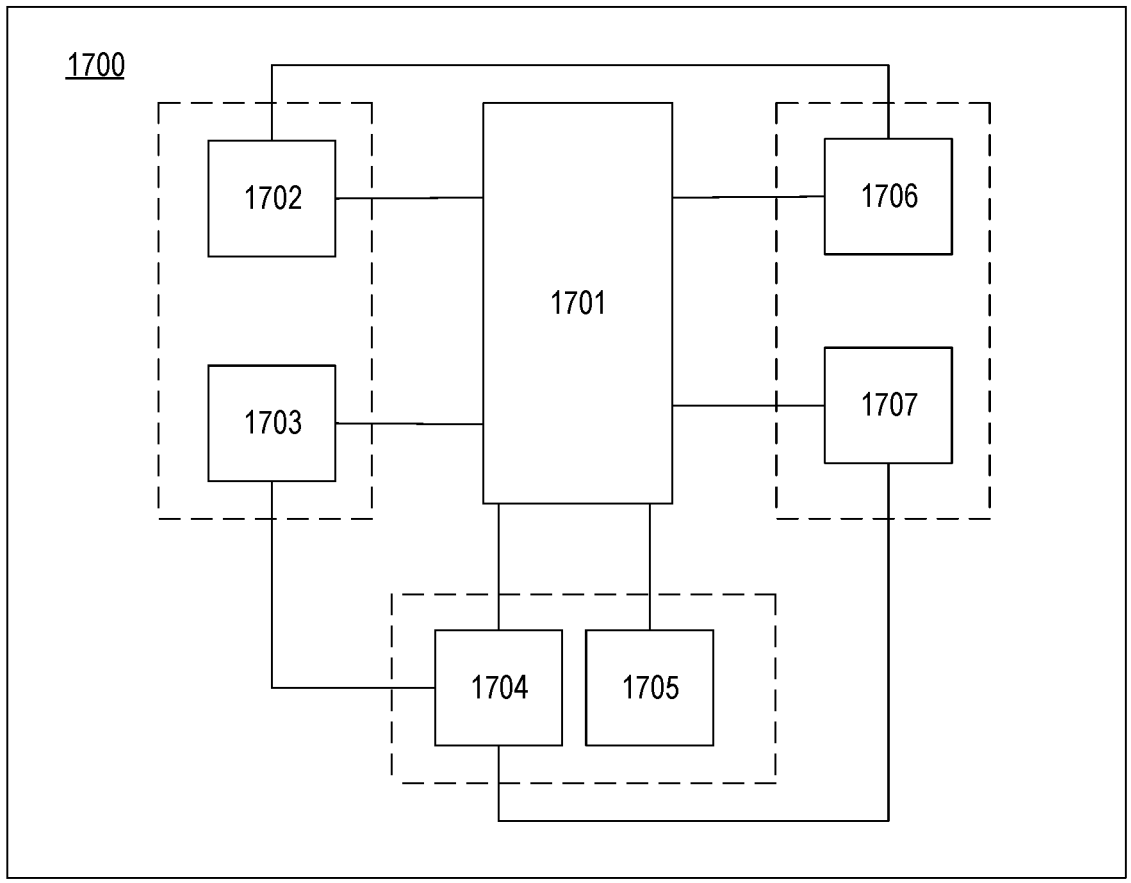
FIG. 7 is a schematic structural diagram of an NoC processing system 1700 according to an embodiment.

As shown in FIG. 7, one embodiment provides an NoC processing system 1700, where the system includes: a storage device 1701 and six computation devices (computation devices 1702 to 1707). The storage device 1701 and the six computation devices (the computation devices 1702 to 1707) are arranged on a same chip of the NoC processing system 1700. The six computation devices may be divided into three clusters: the computation device 1702 and the computation device 1703 are designated as a first computation device cluster (cluster1), the computation device 1704 and the computation device 1705 are designated as a second computation device cluster (cluster2), and the computation device 1706 and the computing device 1707 are designated as a third computation device cluster (cluster3), where cluster1, cluster2, and cluster3 are connected to each other and are all connected to the storage medium 1701. The computation devices 1702 to 1707 are all connected to the storage storage device 1701. The computation device 1703 in cluster1 is connected to the storage device 1704 in cluster2, the computation device 1704 in cluster2 is connected to the computation device 1707 in cluster3, and the computation device 1702 in cluster1 is connected to the computation device 1706 in cluster3.

Specifically, when cluster3 needs to read data, cluster2 may access the storage device 1701 and read data required by cluster3 from the storage device 1701; or cluster1 may access the storage device 1701, read data required by cluster3 from the storage device 1701, and directly send the data to cluster3. A plurality of computation devices may be divided into a plurality of clusters, and a count of computation devices in each cluster is not specifically limited. For example, one cluster may include four computation devices.

Optionally, not all of the plurality of computation devices are required to be connected to the storage device 1701, as long as at least one of the two computation device clusters is connected to the storage device 1701, which is not specifically limited herein. Optionally, each computation device in cluster1 may be connected to the second device cluster and/or cluster3, as long as at least one computation device in cluster1 is ensured to be connected to at least one computation device in cluster2 and cluster3, which is not specifically limited herein. Optionally, any computation device in cluster1 may be connected to any computation device in cluster2 and/or cluster3, which is not limited herein.

In the above-mentioned NoC processing system, by establishing a direct connection among a plurality of computation devices arranged on the same chip, the efficiency of data reading and writing may be improved.

In one embodiment, the present disclosure also provides an NoC processing system. The system includes: a storage device and a plurality of computation device clusters, where the storage device and the plurality of computation device clusters are arranged on the same chip. Each computation device cluster includes a plurality of computation devices. At least one of the plurality of computation device clusters is connected to the storage device, at least two computation device clusters are connected to each other, and a plurality of computation devices in each computation device cluster are connected to each other.

Figure 8:
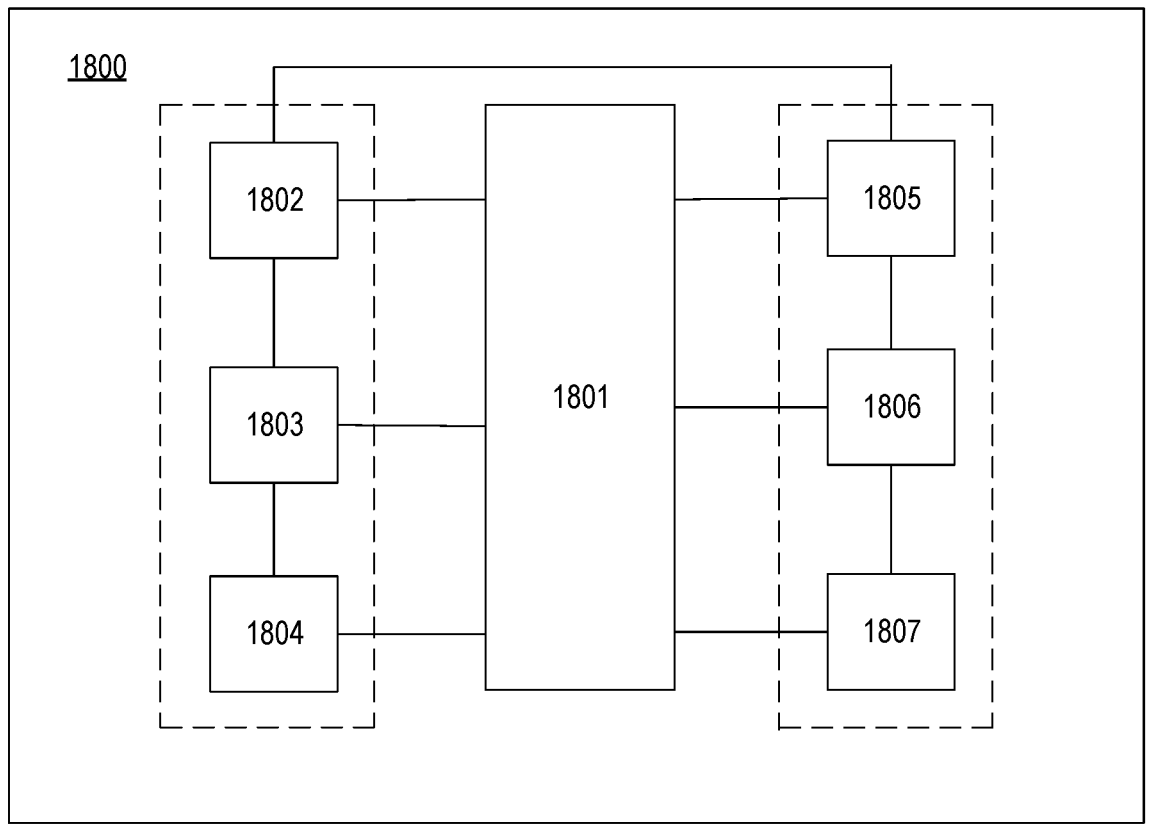
FIG. 8 is a schematic structural diagram of an NoC processing system 1800 according to an embodiment.

As shown in FIG. 8, one embodiment provides an NoC processing system 1800, where the system includes: a storage device 1801 and six computation devices (computation devices 1802 to 1807). The storage device 1801 and the six computation devices (the computation devices 1802 to 1807) are arranged on a same chip of the NoC processing system 1800. The six computation devices are divided into two clusters: the computation device 1802, the computation device 1803, and the computation device 1804 are designated as a first computation device cluster (cluster1), the computation device 1805, the computation device 1806, and the computation device 1807 are designated as a second computation device cluster (cluster2), where cluster1 and cluster2 are connected to each other and are both connected to the storage device 1801. The three computation devices in cluster1 are connected to each other, and the three computation devices in cluster2 are connected to each other. The computation devices 1802 to 1807 are all connected to the storage storage device 1801. The computation device 1802 in cluster1 is connected to the storage device 1805 in cluster2. The computation device 1803, the computation device 1802, and the computation device 1804 are connected to each other. The computation device 1806, the computation device 1805, and the computation device 1807 are connected to each other. Connection manners of a plurality of computation devices in each computation device cluster will not be further described herein. For details, please refer to connection manners of the NoC processing systems 1100 to 1400.

Specifically, when cluster2 needs to read data, cluster2 may directly access the storage device 1801; or cluster1 may access the storage device 1801, read data required by cluster2 from the storage device 1801, and send the data to cluster2; at the same time, the second computation device may perform inter-cluster data transfer. When cluster2 needs to read data, the computation device 1805, the computation device 1806, and the computation device 1807 in cluster2 may simultaneously access storage device 1801, where the computation device 1805, the computation device 1806, and the computation device 1807 respectively read part of data required by cluster2, and the data can be transferred in cluster2. A plurality of computation devices may be divided into a plurality of clusters, and a count of computation devices in each cluster is not specifically limited. For example, one cluster may include four computation devices.

Optionally, not all of the plurality of computation devices are required to be connected to the storage device 1801, as long as at least one of the two computation device clusters is connected to the storage device 1801, which is not specifically limited herein. Optionally, each computation device in cluster1 may be connected to the second device cluster, as long as at least one computation device in cluster1 is ensured to be connected to at least one computation device in cluster2, which is not specifically limited herein. Optionally, any computation device in cluster1 may be connected to any computation device in cluster2, which is not limited herein.

In the above-mentioned NoC processing system on a chip, by establishing a connection among a plurality of computation device clusters arranged on the same chip and establishing a connection among a plurality of computation devices in each computation device cluster, both intra-cluster communication and inter-cluster communication may be realized among a plurality of computation devices, which may reduce energy consumption of memory access and improve the efficiency of reading data.

In an embodiment, the present disclosure provides an NoC processing system, where the system includes a plurality of interconnected NoC processing modules. The plurality of NoC processing modules are arranged on a same chip. Each of the NoC processing modules includes at least one storage device and a plurality of computation devices. In each of the NoC processing modules, at least one computation device is connected to at least one storage device NoC processing modules, and at least two of the plurality of computation devices are connected to each other.

In an embodiment, a neural network chip is provided, where the chip includes a plurality of interconnected NoC processing modules. Each of the NoC processing modules includes: at least one storage device, a plurality of computation devices, a first interconnection device, and a second interconnection device. In each NoC processing module, at least one computation device is connected to at least one storage device through the first interconnection device, and the plurality of computation devices are connected to each other through the second interconnection device. Further, the computation device may implement a read/write operation on the storage device in the same NoC processing module through the first interconnection device, and a plurality of computation devices may also perform data transfer through the second interconnection device.

Figure 9:
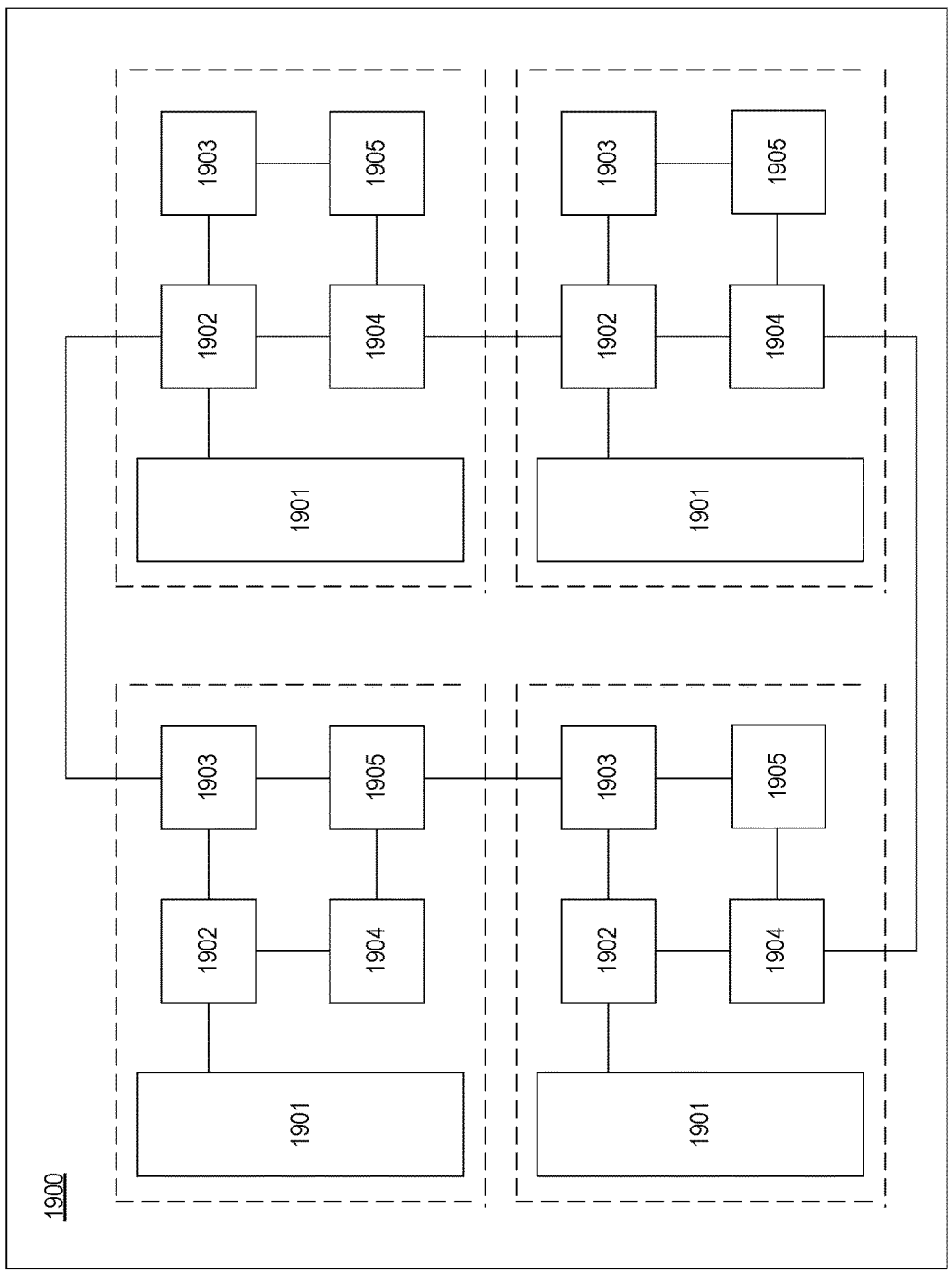
FIG. 9 is a schematic structural diagram of an NoC processing system 1900 according to an embodiment.

As shown in FIG. 9, one embodiment of the present disclosure provides an NoC processing system 1900, where the system 1900 includes four interconnected NoC processing modules. The four NoC processing modules are arranged on a same chip. Each of the NoC processing modules includes a storage device 1901 and four computation devices (computation devices 1902 to 1905). In each NoC processing module, the computation device 1902 is connected to the storage device 1901, and the four computation devices are connected to each other.

Specifically, all data to be processed by each NoC processing module is stored in the storage device inside the NoC processing module. In other words, a plurality of computation devices in each NoC processing module can only access the storage device in the same NoC processing module, and can only read and write data from the storage device in the same NoC processing module.

Optionally, there may be one or more storage devices in each NoC processing module, which is not limited herein. Preferably, each NoC processing module includes four storage devices. Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 1901, as long as at least one of the computation devices in each NoC processing module is connected to the storage device 1901, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, by establishing a connection among a plurality of NoC processing modules arranged on the same chip and establishing a connection among a plurality of computation devices in each NoC processing module, both intra-module communication and inter-module communication may be realized among a plurality of computation devices, which may reduce energy consumption of memory access and improve the efficiency of reading data; at the same time, a plurality of computation devices arranged on the same chip establish inter-module communication in a plurality of connection manners, establish a plurality of communication channels among the plurality of computation devices, and select an optimal channel for data transfer according to current network congestion, which may save energy consumption and improve data processing efficiency.

In an embodiment, the present disclosure provides an NoC processing system, where the system includes a plurality of interconnected NoC processing modules. The plurality of NoC processing modules are arranged on a same chip. Each of the NoC processing modules includes a plurality of storage devices. In each of the NoC processing modules, at least one computation device is connected to the plurality of storage devices in the NoC processing module, and at least two of the plurality of computation devices are connected to each other.

Figure 10A:
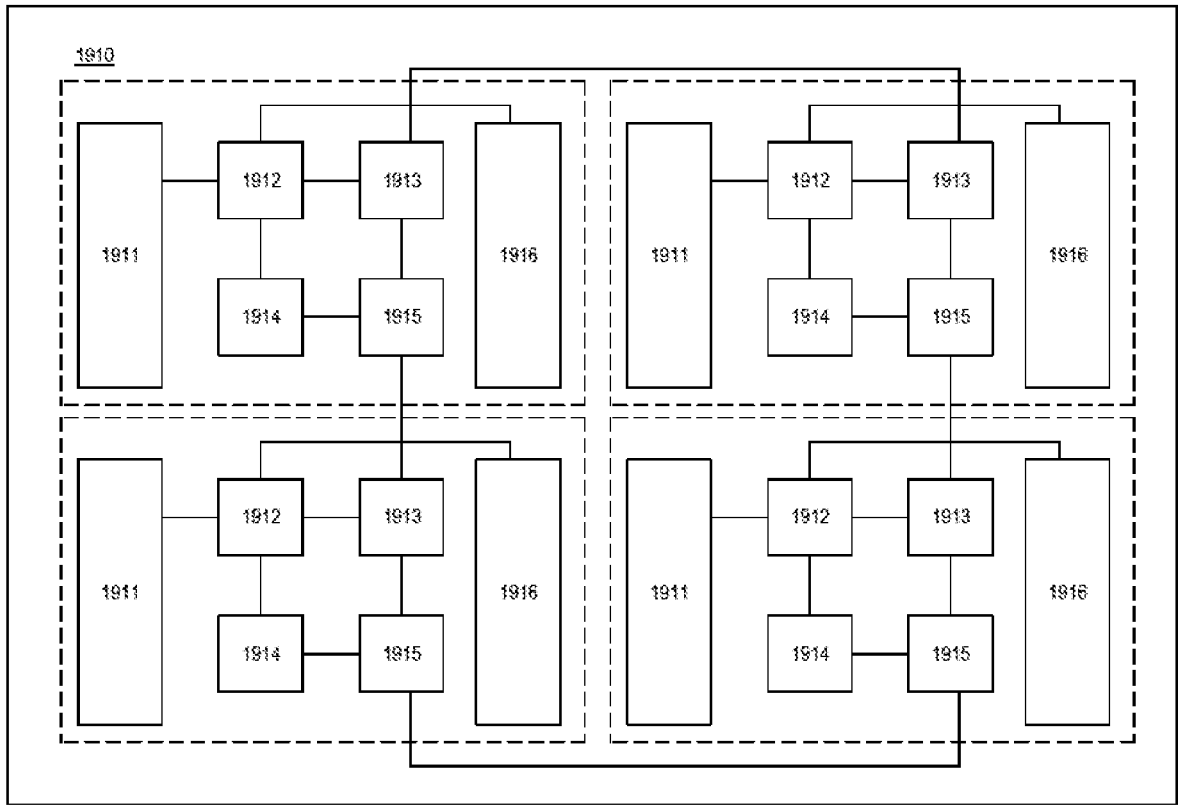
FIG. 10a is a schematic structural diagram of an NoC processing system 1910 according to an embodiment.

As shown in FIG. 10a, an embodiment of the present disclosure provides an NoC processing system 1910, where the system 1910 includes four interconnected NoC processing modules. The four NoC processing modules are arranged on a same chip. Each of the NoC processing modules includes: a storage device 1911, a storage device 1916, and four computation devices (computation devices 1912 to 1915). In each NoC processing module, the computation device 1912 is connected to the storage device 1911 and the storage device 1916 in the same NoC processing module, and the four computation devices are connected to each other.

Specifically, all data to be processed by each NoC processing module is stored in the storage device inside the NoC processing module. In other words, a plurality of computation devices in each NoC processing module can only access the storage device in a same NoC processing module, and can only read and write data from the storage device in the same NoC processing module. At least one computation device in each NoC processing module is connected to all storage devices in the same NoC processing module. In other words, the computation devices in each NoC processing module can access all the storage devices in the same NoC processing module. There may be two or more storage devices in each NoC processing module, which is not limited herein. Preferably, each NoC processing module includes four storage devices, which can simultaneously save space and perform efficient data processing.

Specifically, computation devices in each NoC processing module preferentially access an adjacent storage device. The adjacent storage device is a storage device with a shortest communication distance in a plurality of storage devices connected to the computation devices. In other words, access priority of the storage device with the shortest communication distance is higher than other storage devices.

Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 1911, as long as at least one of the computation devices in each NoC processing module is connected to the storage device 1911, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, each computation device can access all storage devices in the NoC processing module and provide a plurality of communication channels for data transfer, which may improve the efficiency of data reading and writing; each computation device in the system preferentially accesses an adjacent storage device, which may simultaneously save memory access overhead and ensure certain flexibility.

Figure 10B:
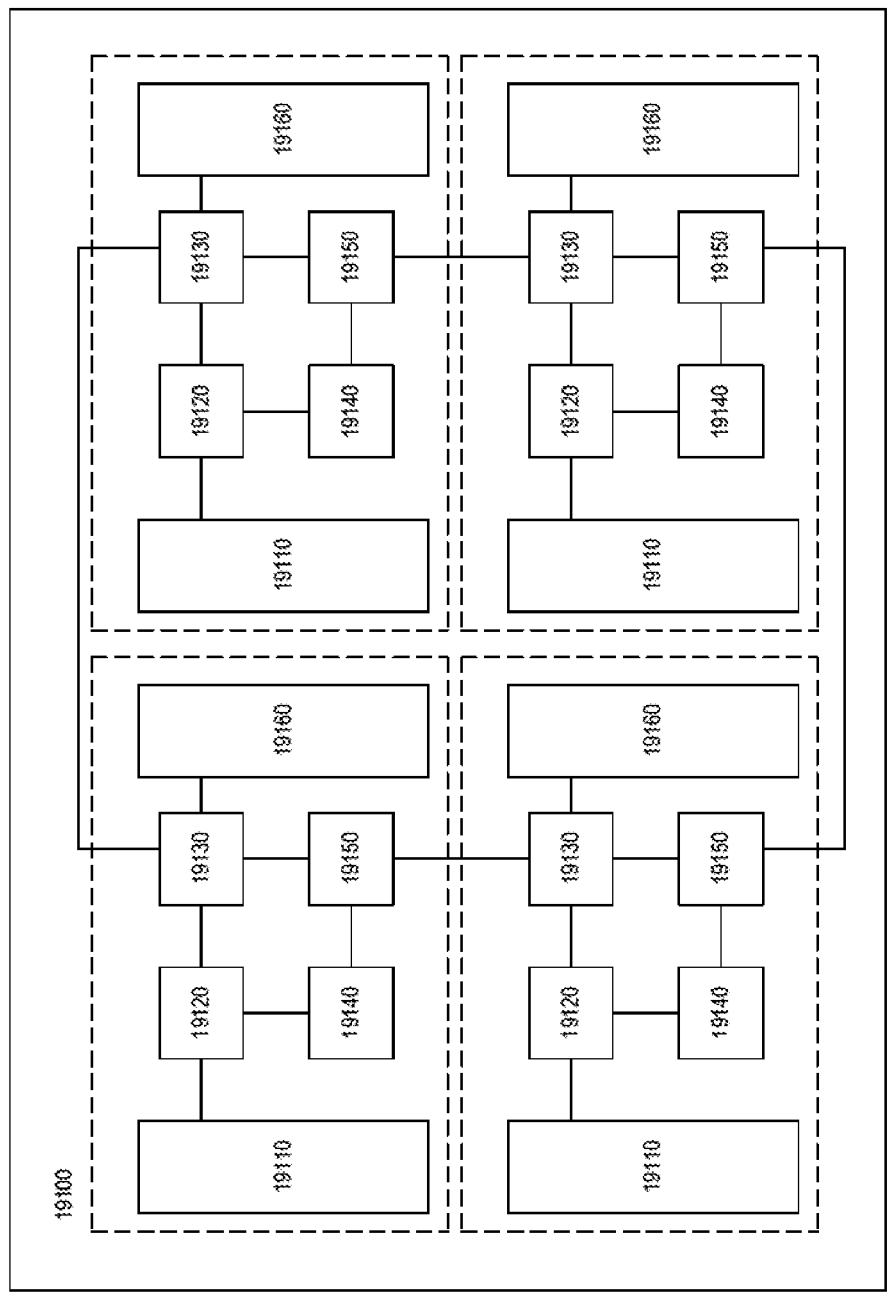
FIG. 10b is a schematic structural diagram of an NoC processing system 19100 according to an embodiment.

In an embodiment, in the NoC processing system 19100 shown in FIG. 10b, all data to be processed by each NoC processing module is stored in the storage device inside the NoC processing module. In other words, a plurality of computation devices in each NoC processing module can only access the storage device in a same NoC processing module, and can only read and write data from the storage device in the same NoC processing module. At least one computation device in each NoC processing module is connected to all storage devices in the same NoC processing module. In other words, the computation devices in each NoC processing module can access all the storage devices in the same NoC processing module. There may be two or more storage devices in each NoC processing module, which is not limited herein. Preferably, each NoC processing module includes four storage devices.

Specifically, in each NoC processing module, each computation device is connected to a storage device with a first communication distance, where the first communication distance refers to a shortest communication distance. In other words, each computation device in each NoC processing module can only access an adjacent storage device (a storage device of which the communication distance to the computation device is the shortest). For example, the computation device 19120 can only access the adjacent storage device 19110 instead of the storage device 19160; the computation device 19130 can only access the adjacent storage device 19160 instead of the storage device 19110; when data required by the computation device 19120 is stored in the storage device 19160, the computation device 19130 needs to read the data from the storage device 19160 first and then transfer the data to the computation device 19120.

Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 19110, as long as at least one of the computation device in each NoC processing module is connected to the storage device 19110, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, each computation device can access all storage devices in the NoC processing module and provide a plurality of communication channels for data transfer, which may improve the efficiency of data reading and writing; each computation device in the system can only access an adjacent storage device, which may maximally save memory access overhead.

In an embodiment, the present disclosure provides an NoC processing system. In the system, any two NoC processing modules are direcly connected to each other and are arranged on a same chip. Each of the NoC processing modules includes at least one storage device and a plurality of computation devices. In each of the NoC processing modules, at least one computation device is connected to at least one storage device NoC processing modules, and at least two of the plurality of computation devices are connected to each other.

Figure 11:
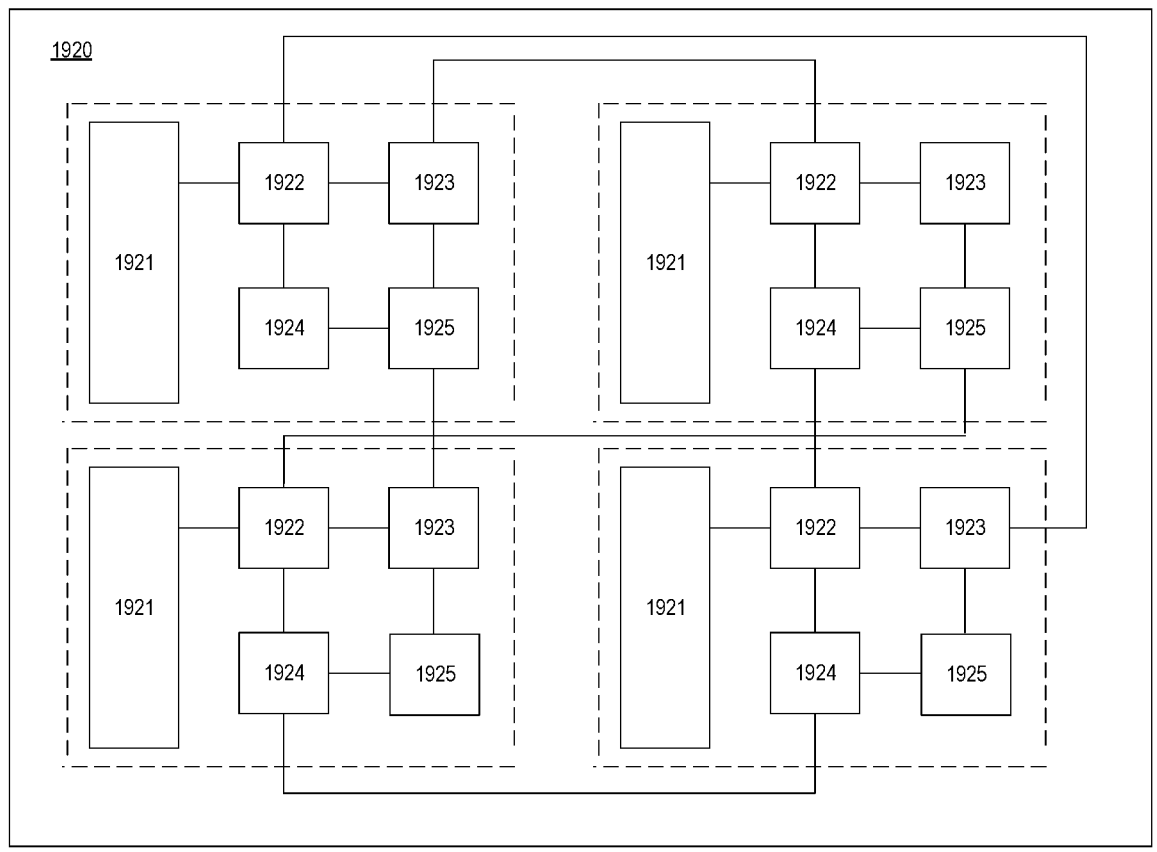
FIG. 11 is a schematic structural diagram of an NoC processing system 1920 according to an embodiment.

As shown in FIG. 11, an embodiment of the present disclosure provides an NoC processing system 1920, where the system 1920 includes four interconnected NoC processing modules. The four NoC processing modules are arranged on a same chip of the Noc processing system 1920. Any two of the four NoC processing modules are directly connected to each other. Each of the NoC processing modules includes a storage device 1921 and four computation devices (computation devices 1922 to 1925). In each NoC processing module, the computation device 1922 is connected to the storage device 1921 and the four computation devices are connected to each other.

Specifically, all data to be processed by each NoC processing module is stored in the storage device inside the NoC processing module. In other words, a plurality of computation devices in each NoC processing module can only access the storage device in a same NoC processing module, and can only read and write data from the storage device in the same NoC processing module.

Optionally, there may be one or more storage devices in each NoC processing module, which is not limited herein. Preferably, each NoC processing module includes four storage devices. Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 1921, as long as at least one of the computation devices in each NoC processing module is connected to the storage device 1921, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, by establishing a connection among a plurality of computation device modules arranged on the same chip and establishing a connection among a plurality of computation devices in each computation device module, intra-module communication may be realized among a plurality of computation devices, and direct inter-module communication may be realized between any two NoC processing modules. The system may simultaneously reduce a count of computation devices that simultaneously read the storage device interface, reduce bandwidth blockage, and improve the efficiency of data reading and writing through inter-module data transfer.

In an embodiment, the present disclosure provides an NoC processing system. In the system, any two NoC processing modules are directly connected to each other and are arranged on a same chip. Each of the NoC processing modules includes a plurality of storage devices. In each of the NoC processing modules, at least one computation device is connected to the plurality of storage devices in the NoC processing module, and at least two of the plurality of computation devices are connected to each other.

Figure 12:
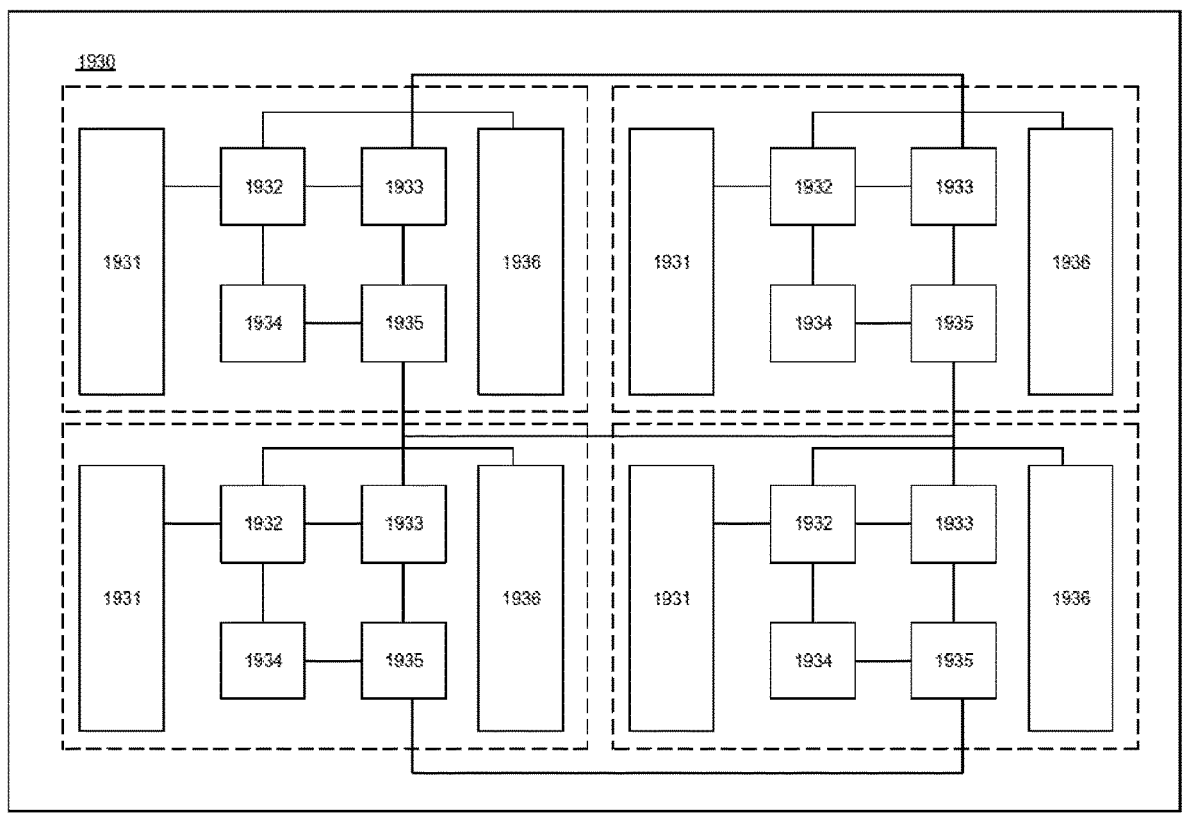
FIG. 12 is a schematic structural diagram of an NoC processing system 1930 according to an embodiment.

As shown in FIG. 12, one embodiment of the present disclosure provides an NoC processing system 1930, where the system 1930 includes four interconnected NoC processing modules. The four NoC processing modules are arranged on a same chip of the Noc processing system 1920. Any two of the four NoC processing modules are directly connected to each other. Each of the NoC processing modules includes a storage device 1931, a storage device 1936, and four computation devices (computation devices 1932 to 1935). In each NoC processing module, the computation device 1932 is connected to the storage device 1931 and the storage device 1936, and the four computation devices are connected to each other.

Specifically, all data to be processed by each NoC processing module is stored in the storage device inside the NoC processing module. In other words, a plurality of computation devices in each NoC processing module can only access the storage device in a same NoC processing module, and can only read and write data from the storage device in the same NoC processing module. Specifically, computation devices in each NoC processing module preferentially access an adjacent storage device.

Optionally, there may be two or more storage devices in each NoC processing module, which is not limited herein. Preferably, each NoC processing module includes four storage devices. Specifically, at least one computation device in each NoC processing module is connected to all storage devices in the same NoC processing module. In other words, the computation devices in each NoC processing module can access all the storage devices in the same NoC processing module.

Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 1931, as long as at least one of the computation devices in each NoC processing module is connected to the storage device 1931, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, each computation device can access all storage devices in the NoC processing module, and direct inter-module communication may be realized between any two NoC processing modules. The system may provide a plurality of communication channels for data transfer, which may improve the efficiency of data reading and writing; each computation device in the system preferentially accesses an adjacent storage device, which may simultaneously save memory access overhead and ensure certain flexibility.

Figure 13:
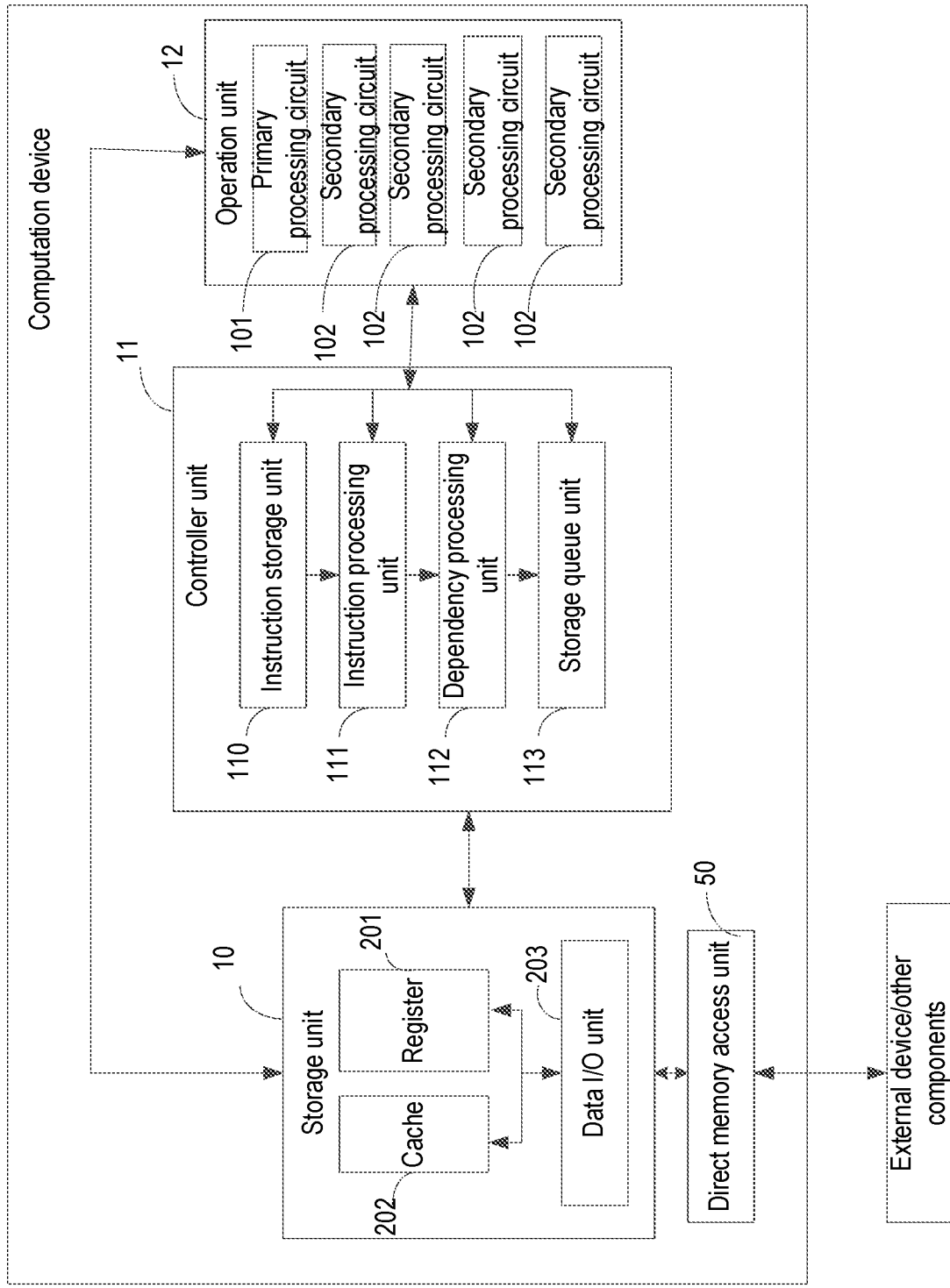
FIG. 13 is a schematic structural diagram of a computation device according to an embodiment.

In one embodiment, as shown in FIG. 13, a computation device in the NoC processing system shown in FIG. 13 may be configured to perform a machine learning computation. The computation device may include a controller unit 11 and a operation unit 12, where the controller unit 11 may be connected to the operation unit 12, and the operation unit 11 may include a primary processing circuit and a plurality of secondary processing circuits;

the controller unit 11 is configured to obtain input data and a computation instruction; optionally, input data and a computation instruction may be obtained through a data input/output unit, where the data input/output unit may specifically be one or more data I/O interfaces or I/O pins.

The above computation instruction includes, but is not limited to, a forward operation instruction, a backward training instruction, or other neural network operation instructions such as a convolution operation instruction. Specific forms of the above computation instructions is not limited herein.

Specifically, the controller unit 11 is further configured to parse the computation instruction to obtain a plurality of operation instructions, and send the plurality of computation instructions and the input data to the primary processing circuit.

The operation unit 12 includes a primary processing circuit 101 and a plurality of secondary processing circuits 102. the primary processing circuit 101 is configured to perform preorder processing on the input data, and send data and the operation instructions among the primary processing circuit and the plurality of secondary processing circuits;

the plurality of secondary processing circuits 102 are configured to perform intermediate computations in parallel according to data and computation instructions sent by the primary processing circuit to obtain a plurality of intermediate results, and send the plurality of intermediate results to the primary processing circuit; and the primary processing circuit 101 is further configured to perform postorder processing on the plurality of intermediate results to obtain a computation result of the computation instruction.

The technical solutions provided in the present disclosure sets the operation unit into a single-master-multiple-slave structure and may split data according to a computation instruction of a forward operation. In this way, a plurality of secondary processing circuits may perform operations on the parts with large computation amount in parallel, which may increase the operation speed, save operation time, and reduce power consumption.

Optionally, the above computation device may further include: a storage unit 10 and a direct memory access (DMA) unit 50. The storage unit 10 may include: one or more of a register and a cache. Specifically, the cache is configured to store the computation instruction; the register is configured to store the input data and a scalar; and the cache is a scratchpad memory. The DMA unit 50 is configured to read or store data from the storage unit 10.

Optionally, the controller unit includes: an instruction storage unit 110, an instruction processing unit 111, and a storage queue unit 113, where the instruction storage unit 110 is configured to store a computation instruction associated with the artificial neural network operation;

the instruction processing unit 111 is configured to parse the computation instruction to obtain a plurality of operation instructions; and the storage queue unit 113 is configured to store an instruction queue, where the instruction queue includes: a plurality of operation instructions and/or a computation instruction to be executed in an order of the instruction queue.

For example, in an optional embodiment, the primary processing circuit may also include a controller unit, where the controller unit may include a primary instruction processing unit configured to decode an instruction into a micro-instruction. In another optional embodiment, the secondary processing circuit may also include a controller unit, where the controller unit may include a secondary instruction processing unit configured to receive and process a micro-instruction. The above micro-instruction may be a next-level instruction of the instruction. The micro-instruction may be obtained by splitting or decoding the instruction, and may be further decoded into a control signal for various components, units, or processing circuits.

In an optional embodiment, the structure of the computation instruction is shown in Table 1.

TABLE 1

| Opcode | Register or immediate value | Register or immediate value | ... |
|--------|-----------------------------|-----------------------------|-----|

The ellipsis in the above table means that a plurality of registers or immediate values may be included.

In another optional embodiment, the computation instruction may include: one or more operation fields and an opcode. The computation instruction may include a neural network operation instruction. For example, in a convolution operation instruction, as shown in Table 2, each of register 0, register 1, register 2, register 3, and register 4 may be an operation field. Each of register 0, register 1, register 2, register 3, and register 4 may be a serial number of one or a plurality of registers.

TABLE 2

| Opcode | Register 0 | Register 1 | Register 2 | Register 3 | Register 4 |
|--------|------------|------------|------------|------------|------------|
| COMPUTE | Input data Starting address | Input data Length | Weight Starting address | Weight Length | Address of an activation function interpolation table |
| IO | Address of an external memory of data | Data length | Address of an internal memory of data | | |
| NOP | | | | | |
| JUMP | Target address | | | | |
| MOVE | Input address | Data size | Output address | | |

The register may be an off-chip memory, and in certain applications, may also be an on-chip memory for storing data. The data may be n-dimensional data, where n is an integer greater than or equal to 1. For instance, when n=1, the data is one-dimensional data, which is a vector; when n=2, the data is two-dimensional data, which is a matrix; and when n is equal to or greater than 3, the data is multi-dimensional tensor.

Optionally, the controller unit may further include:

the dependency processing unit 112 configured to determine whether there is an association between a first operation instruction and a zeroth operation instruction before the first operation instruction. If there is an association between the first operation instruction and the zeroth operation instruction, the dependency processing unit caches the first operation instruction in the instruction storage unit, and after the zeroth operation instruction is executed, the dependency processing unit fetches the first operation instruction from the instruction storage unit and sends the first operation instruction to the operation unit.

The determining whether there is an association between the first operation instruction and a zeroth operation instruction before the first operation instruction includes:

fetching a first storage address interval of data (such as a matrix) required in the first operation instruction according to the first operation instruction, fetching a zeroth storage address interval of a matrix required in the zeroth operation instruction according to the zeroth operation instruction; if the first storage address interval and the zeroth storage address interval have an overlapping area, determining that there is an association between the first operation instruction and the zeroth operation instruction; and if the first storage address interval and the zeroth storage address interval do not have an overlapping area, determining that there is no association between the first operation instruction and the zeroth operation instruction.

Figure 14:
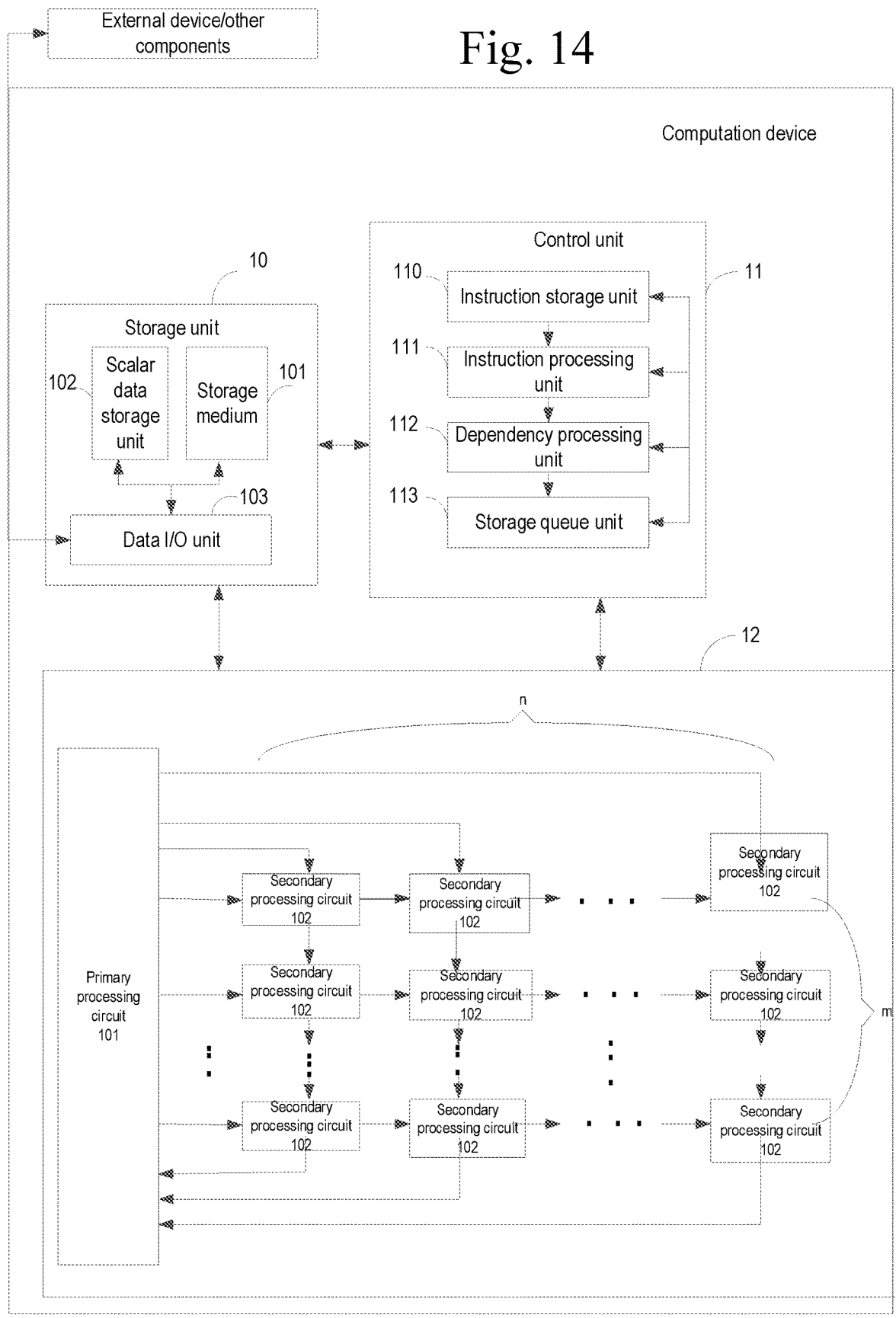
FIG. 14 is a schematic structural diagram of a computation device according to another embodiment.

In another optional example, as shown in FIG. 14, the operation unit 12 may include a primary processing circuit 101 and a plurality of secondary processing circuits 102. In an embodiment, as shown in FIG. 14, the plurality of secondary processing circuits are arranged as an array. Each of the secondary processing circuits are connected to other adjacent secondary processing circuits, and the primary processing circuit is connected to k secondary processing circuits of the plurality of secondary processing circuits, where the k secondary processing circuits may be: n secondary processing circuits in a first row, n secondary processing circuits in an $m^{th\ row}$, and m secondary processing circuits in a first column. It should be noted that, as shown in FIG. 14, k secondary processing circuits only include n secondary processing circuits in the first row, n secondary processing circuits in the $m^{th\ row}$, and m secondary processing circuits in the first column. In other words, the k secondary processing circuits are secondary processing circuits that are directly connected to the primary processing circuit.

The k secondary processing circuits are configured to forward data and instructions among the primary processing circuit and the plurality of secondary processing circuits.

Optionally, as shown in FIG. 15, the primary processing circuit may further include: one or more of a conversion processing circuit 110, an activation processing circuit 111, and an addition processing circuit 112, where the conversion processing circuit 110 is configured to perform conversion between a first data structure and a second data structure (such as a conversion between continuous data and discrete data) on a data block or an intermediate result received by the primary processing circuit, or perform conversion between a first data type and a second data type (such as conversion between a fixed-point type and a floating-point type) on the data block or the intermediate result received by the primary processing circuit;

the activation processing circuit 111 is configured to perform an activation operation on data in the primary processing circuit; and the addition processing circuit 112 is configured to perform an addition operation or an accumulation operation.

The primary processing circuit is configured to determine that the input neuron is broadcast data, the weight is distribution data, partition distribution data into a plurality of data blocks, and send at least one of the plurality of data blocks and at least one of the plurality of operation instructions to the secondary processing circuits;

the plurality of secondary processing circuits are configured to perform an operation on the received data block according to the operation instruction to obtain an intermediate result, and send the operation result to the secondary processing circuits; and the primary processing circuit is configured to process the intermediate results sent by the secondary processing circuits to obtain a result of the computation instruction, and send the result of the computation instruction to the controller unit.

The secondary processing circuit includes: a multiplication processing circuit, where the multiplication processing circuit is configured to perform a multiplication operation on a received data block to obtain a product result;

optionally, the secondary processing circuits may further include a forwarding processing circuit configured to forward the received data block or the product result.

Optionally, the secondary processing circuits may further include an accumulation processing circuit configured to perform an accumulation operation on the product result to obtain the intermediate result.

In another embodiment, the operation instruction is a computation instruction such as a matrix-multi-matrix instruction, an accumulation instruction, an activation instruction, and the like.

A specific calculation method of the computation device shown in FIG. 1 is explained below through a neural network operation instruction. For a neural network operation instruction, a formula to be actually executed may be: $s=s(\Sigma wx_i+b)$, which is to multiply a weight W by input data $x_i$, find a sum, add a bias b, and then perform an activation operation s(h) to obtain a final output result s.

Figure 16:
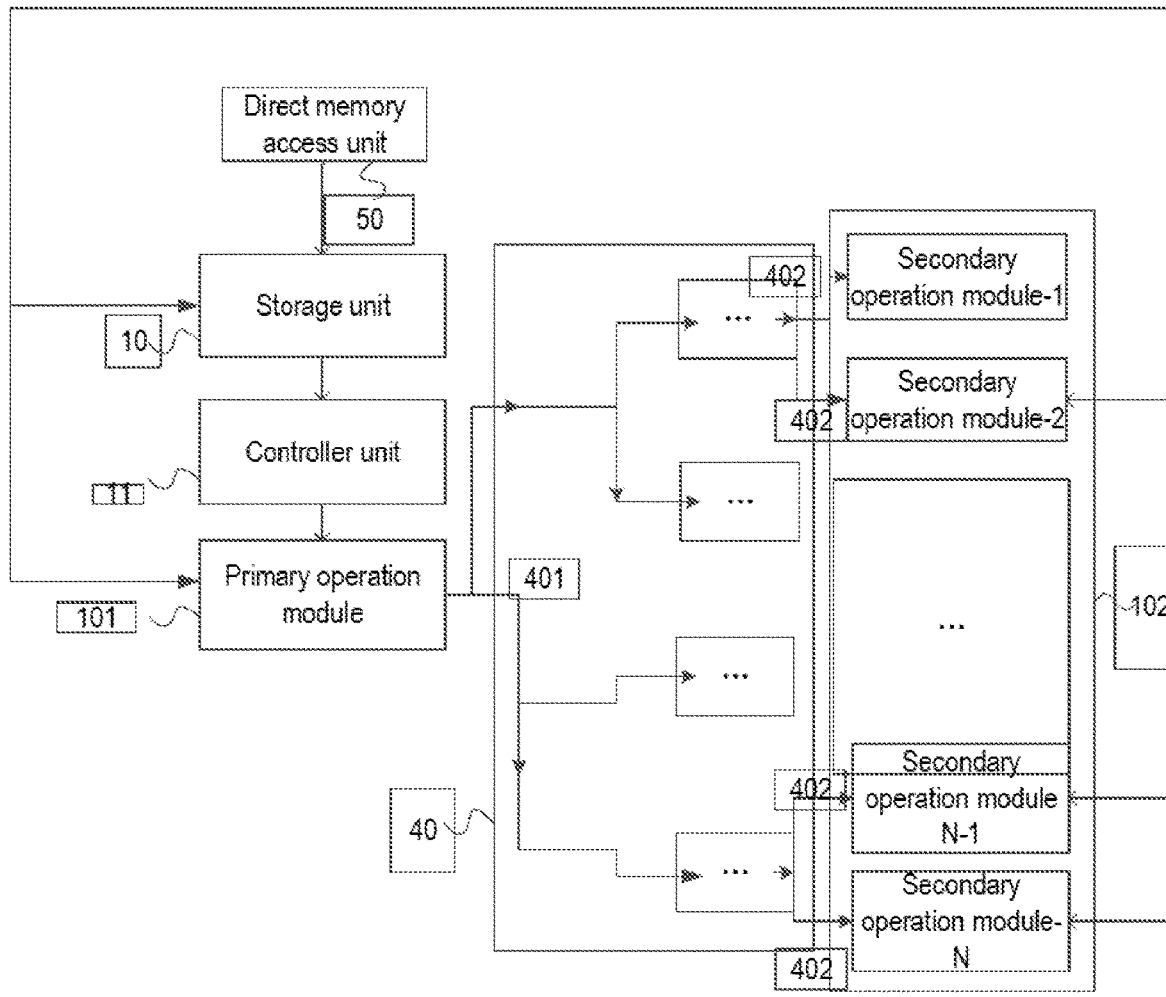
FIG. 16 is a schematic structural diagram of a computation device according to another embodiment.
Figure 17:
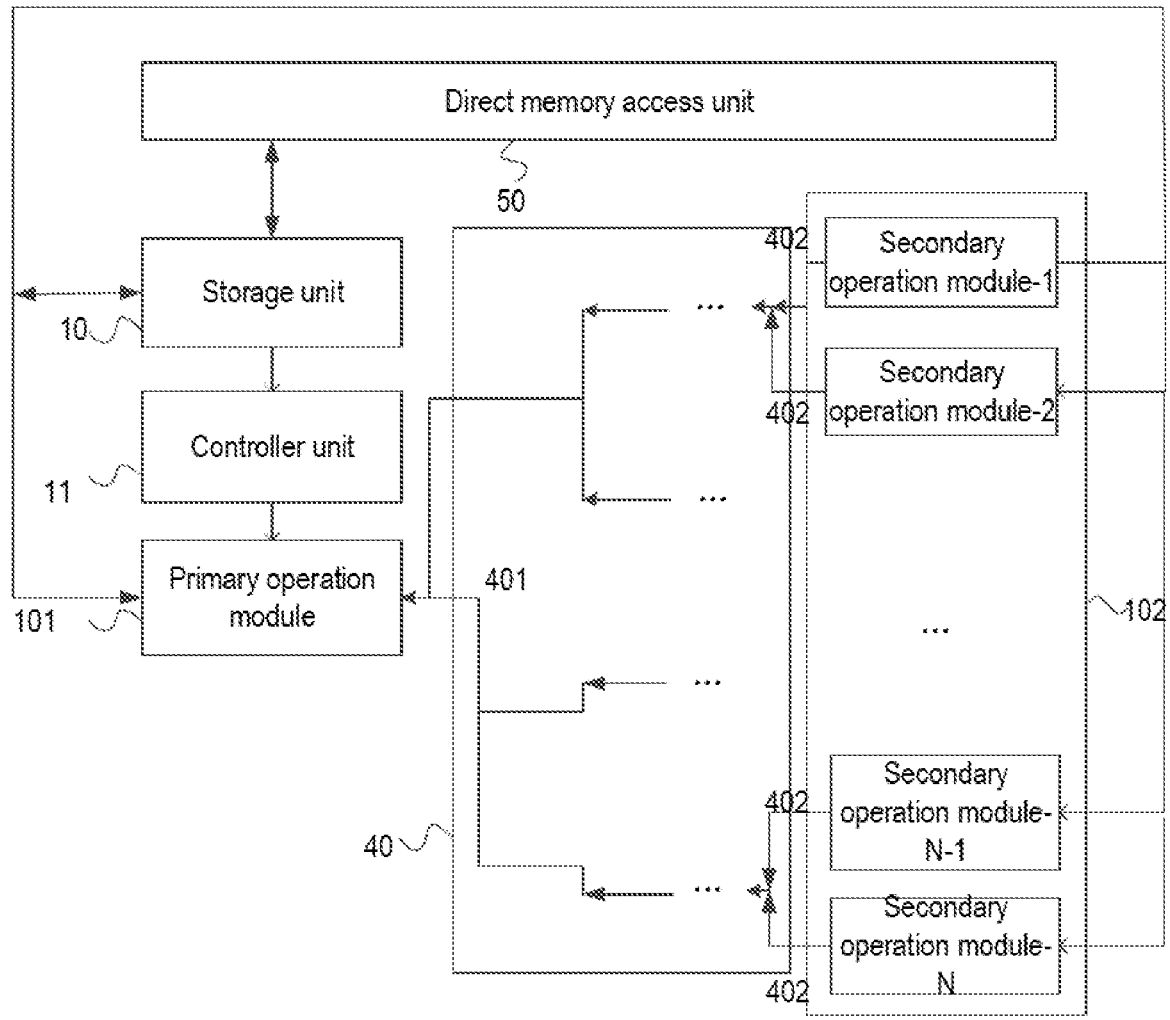
FIG. 17 is a schematic structural diagram of a computation device according to another embodiment.

In an optional embodiment, as shown in FIG. 16, the operation unit includes: a tree module 40 which includes a root port 401 and a plurality of branch ports 404, where the root port is connected to the primary processing circuit, and each of the plurality of branch ports in the tree module is respectively connected to one of the plurality of secondary processing circuits; and the above tree module has a transceiving function. For example, as shown in FIG. 16, the tree module has a transfer function; and as shown in FIG. 17, the tree module has a receiving function.

The tree module is configured to forward a data block, a weight, and an operation instruction between the primary processing circuit and the plurality of secondary processing circuits.

Optionally, the tree module is a selectable result of the computation device and may include a node of one layer. The node is a line structure with a forwarding function, and the node itself may not have a computation function. If the tree module includes a node of a $zero^{th}$ layer, the tree module is not needed.

Figure 18:
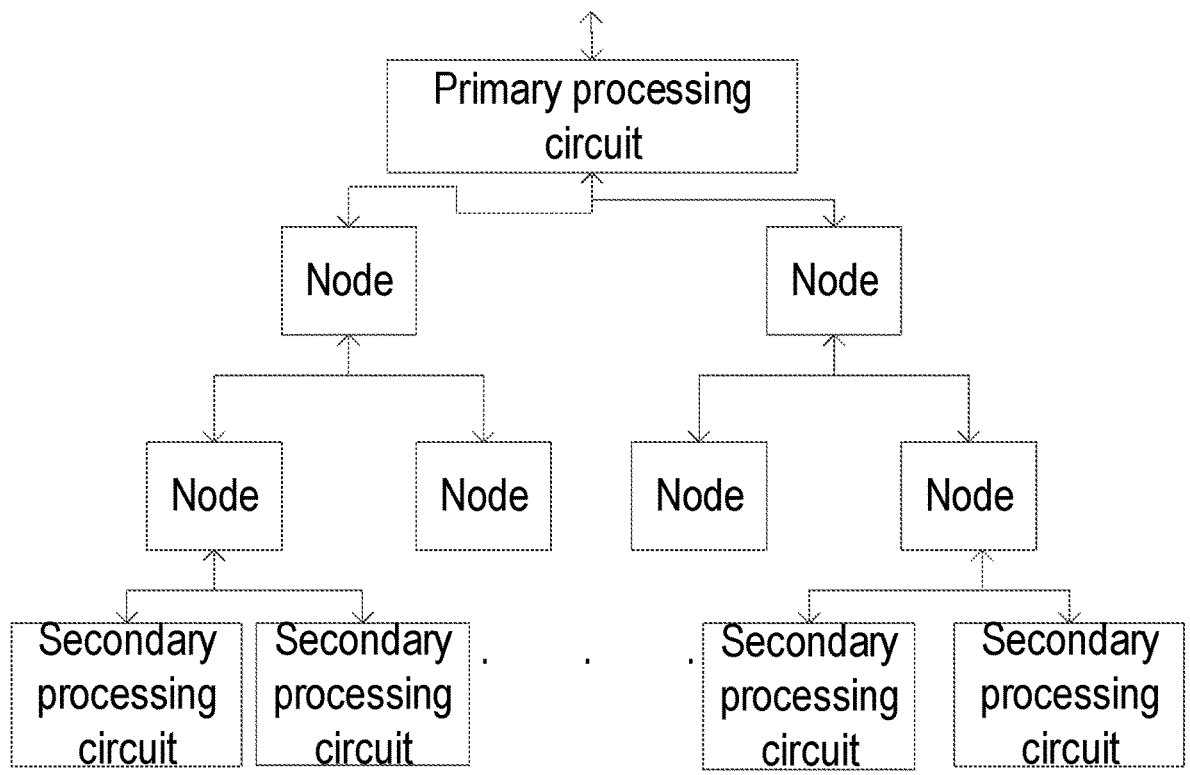
FIG. 18 is a schematic structural diagram of a tree module according to an embodiment.

Optionally, the tree module may be an n-ary tree structure such as a binary tree structure as shown in FIG. 18 or a trinary tree structure, where n may be an integer greater than or equal to 2. A specific value of n is not limited herein. A count of the above layers may also be 2. The secondary processing circuits may be connected to nodes of other layers except a penultimate layer, such as nodes of a last layer as shown in FIG. 18.

Figure 19:
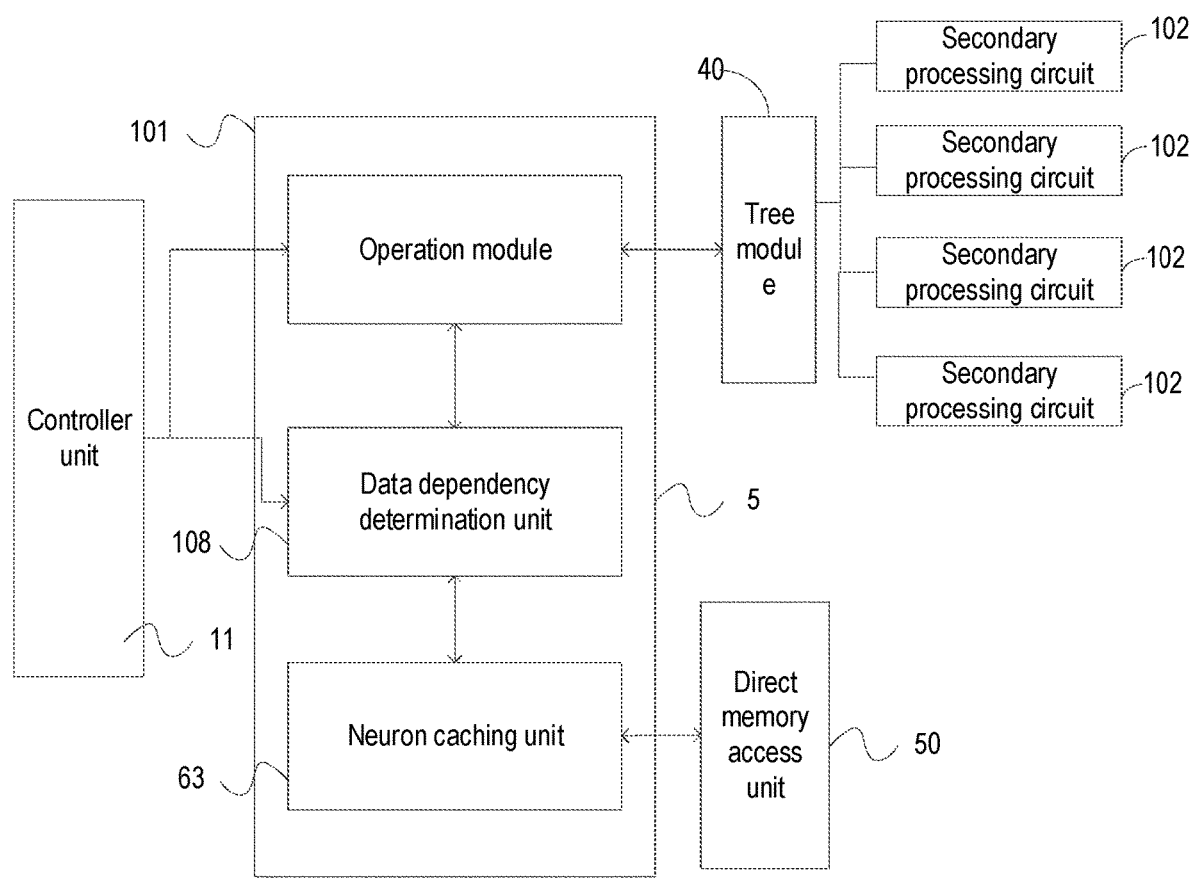
FIG. 19 is a schematic structural diagram of a computation device according to another embodiment.

Optionally, as shown in FIG. 19, the above operation unit may carry a separate cache and may include a neuron caching unit 63, where the neuron caching unit 63 caches input neuron vector data and output neuron value data of the secondary processing circuit.

Figure 20:
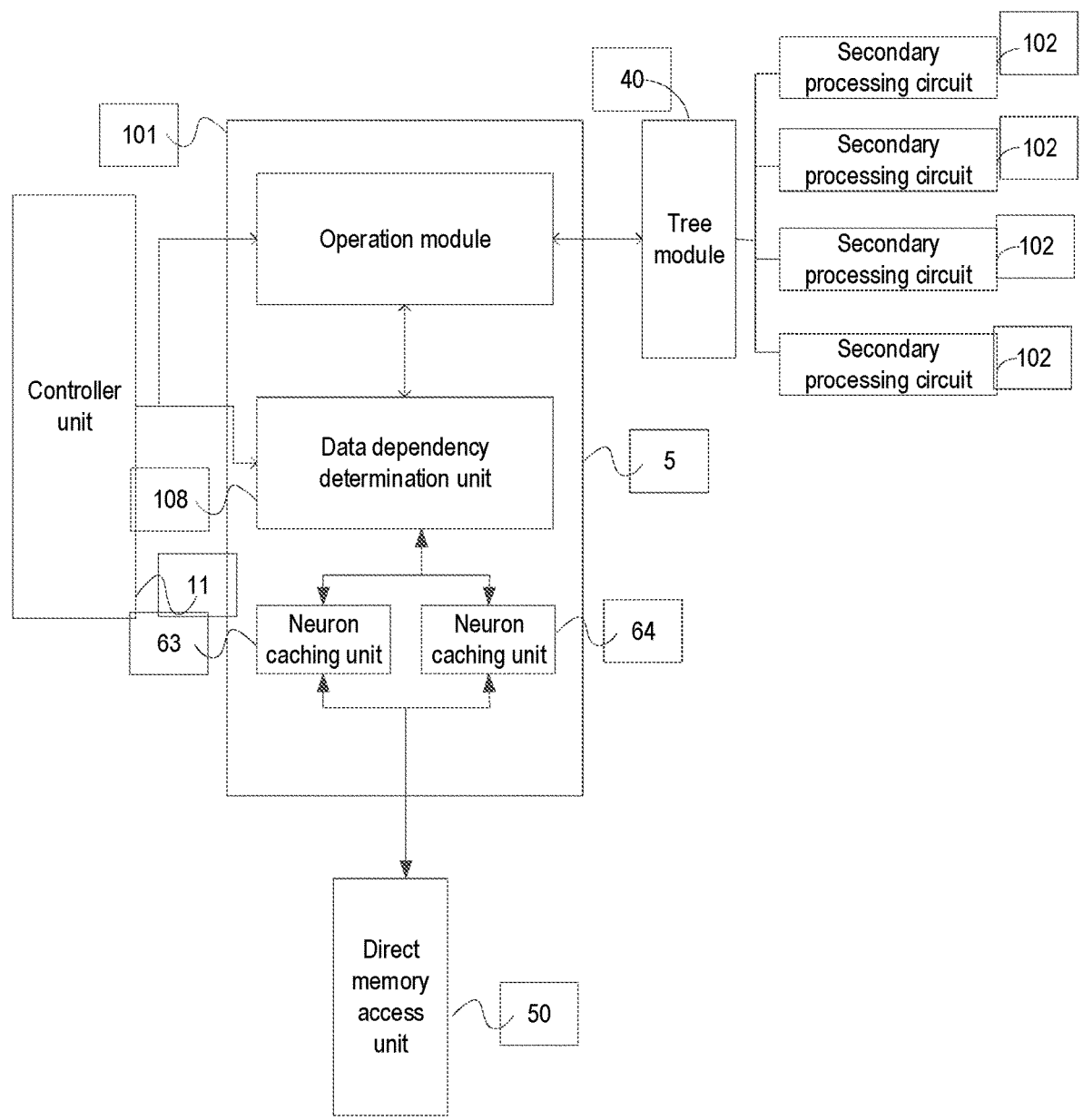
FIG. 20 is a schematic structural diagram of a computation device according to another embodiment.

As shown in FIG. 20, the operation unit may further include: a weight caching unit 64 configured to cache weight data required by the secondary processing circuit in the computation process.

Figure 21:
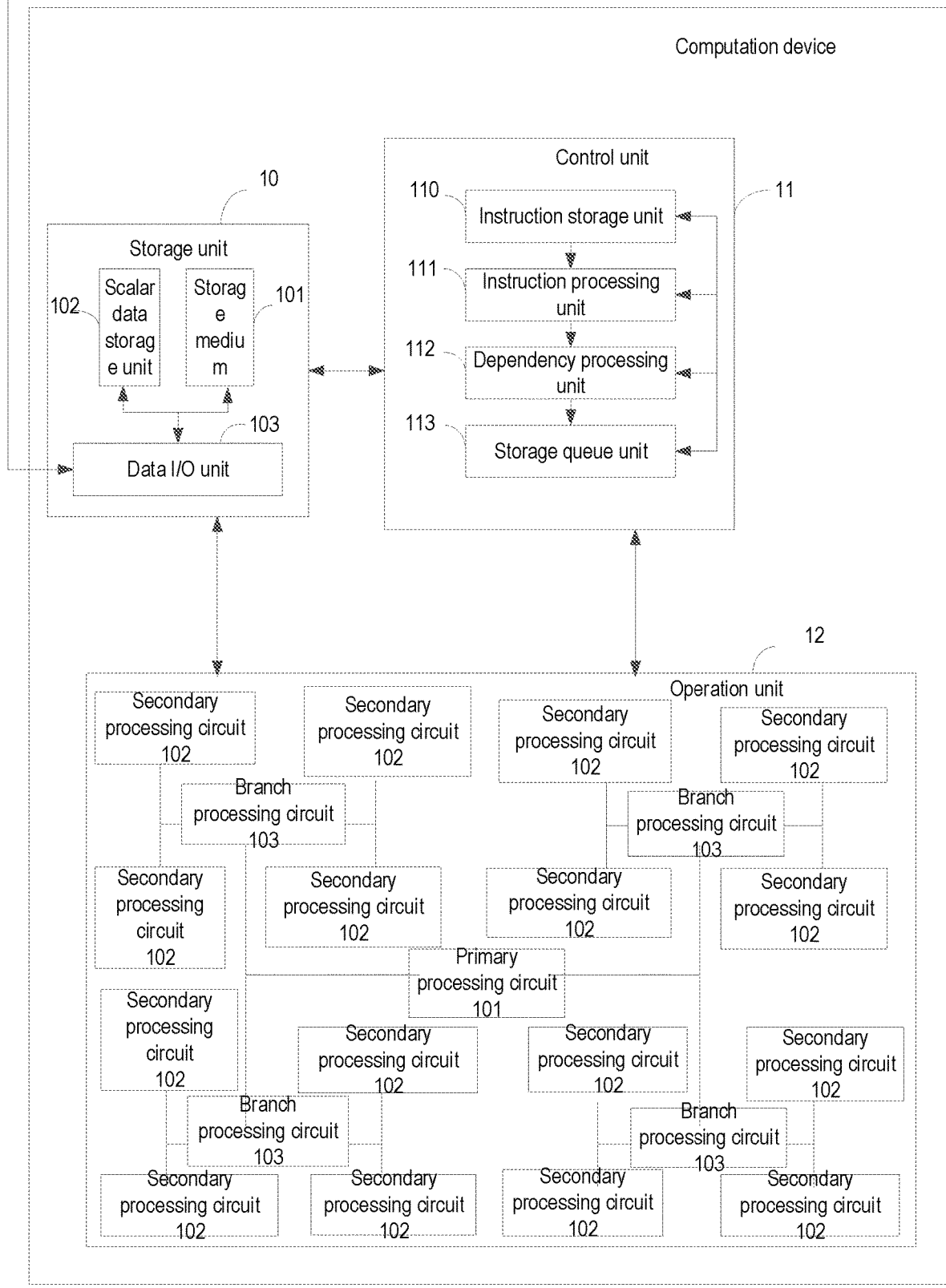
FIG. 21 is a schematic structural diagram of a computation device according to another embodiment.

In an optional embodiment, as shown in FIG. 21, the operation unit 12 may include a branch processing circuit 103; a connection structure of the branch processing circuit 103 is shown in FIG. 21, where the primary processing circuit 101 is connected to one or more branch processing circuits 103, and the branch processing circuit 103 is connected to one ore more secondary processing circuits 102; and the branch processing circuit 103 is configured to forward data or instructions between the primary processing circuit 101 and the secondary processing circuits 102.

The present disclosure further provides a neural network operation device which includes one or more computation devices mentioned in the present disclosure. The neural network operation device is configured to obtain data to be operated and control information from other processing devices, perform a specified neural network operation, and send an execution result to a peripheral apparatus through an I/O interface. The peripheral apparatus may include a camera, a monitor, a mouse, a keyboard, a network card, a WIFI interface, a server, and the like. When more than one of the above computation devices are included, the computation devices may be interconnected and transfer data to each other through a specific structure. For example, the computation devices may be interconnected and transfer data via a PCIE bus to support neural network operations with a larger scale. In this case, the computation devices may share the same control system, or may have separate control systems. The computation devices may share a memory, or each accelerator may have separate memories. In addition, an interconnection method of the computation devices may be any interconnection topology.

The neural network operation device has good compatibility and may be connected to various types of servers through a PCIE interface.

Figure 22:
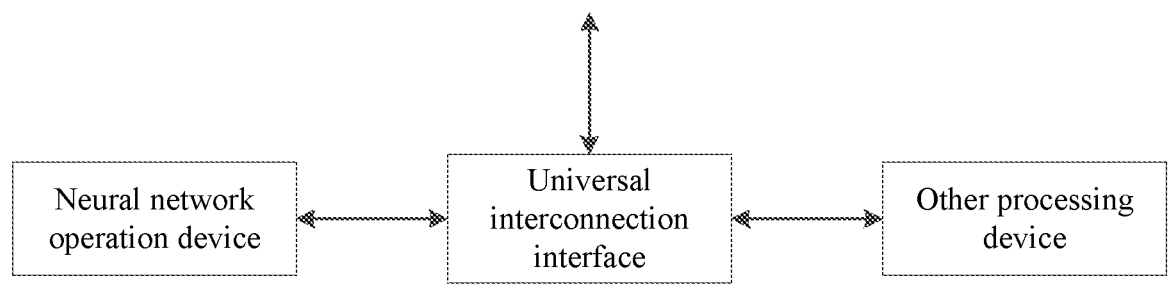
FIG. 22 is a schematic structural diagram of a combined processing device according to an embodiment.

The present disclosure also provides a combined processing device, where the device includes the neural network operation device, a universal interconnection interface, and other processing devices. The neural network operation device interacts with other processing devices to perform operations specified by users. FIG. 22 is a schematic diagram of the combined processing device.

The other processing devices include at least one or more of a general-purpose/special-purpose processors such as a central processing unit (CPU), a graphics processing unit (GPU), a neural network processor, and the like. A count of processors included in the other processing devices is not limited herein. The other processing devices may serve as an interface that connects the neural network operation device to external data and control, including data moving, and may perform the basic control such as starting and stopping the neural network operation device. The other processing devices may also cooperate with the neural network operation device to complete operation tasks.

The universal interconnection interface may be configured to transfer data and control instructions between the neural network operation device and the other processing devices. The neural network operation device may obtain required input data from the other processing devices and write the data in an on-chip storage device of the neural network operation device. The neural network operation device may obtain control instructions from the other processing device, and write the control instructions in an on-chip control cache of the neural network operation device. The neural network operation device may further read data stored in a storage module of the neural network operation device and transfer the data to the other processing devices.

Figure 23:
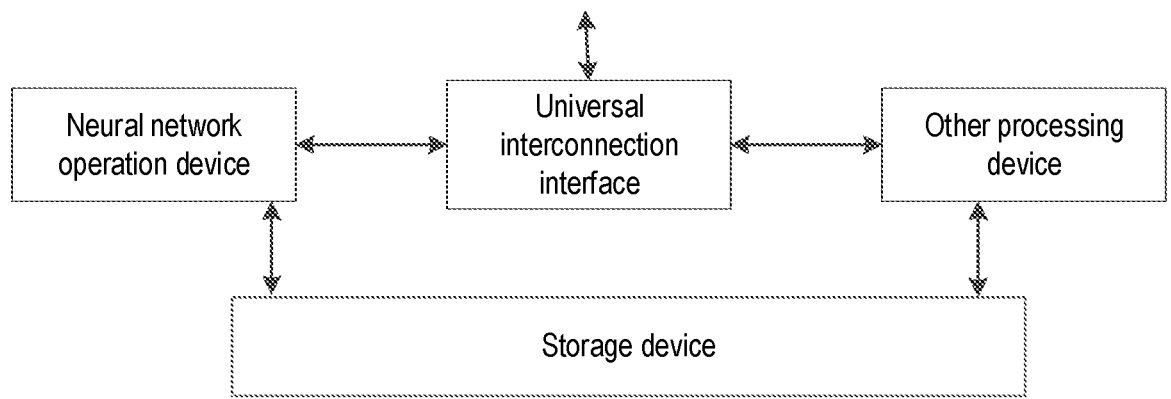
FIG. 23 is a schematic structural diagram of a combined processing device according to another embodiment.

Optionally, as shown in FIG. 23, the structure may further include a storage device, where the storage device is connected to the neural network operation device and the other processing devices respectively, and the storage device is configured to store data of the neural network computation device and the other processing devices. The storage device is configured to store data of the neural network operation device and the other processing devices, and is particularly suitable for a case where data to be operated cannot be completely stored in an internal memory of the neural network operation device or the other processing devices.

The combined processing device may be used as an SOC (System on Chip) of a device such as a mobile phone, a robot, a drone, a video surveillance device, and the like, which may effectively reduce the core area of a control part, increase the processing speed, and reduce the overall power consumption. In this case, a universal interconnection interface of the combined processing device may be connected to some components of the device. The components may include a camera, a monitor, a mouse, a keyboard, a network card, and a WIFI interface.

In some embodiments, the present disclosure provides a chip which includes the above neural network computation device or the combined processing device.

In some embodiments, the present disclosure provides a chip package structure which includes the above chip.

Figure 24:
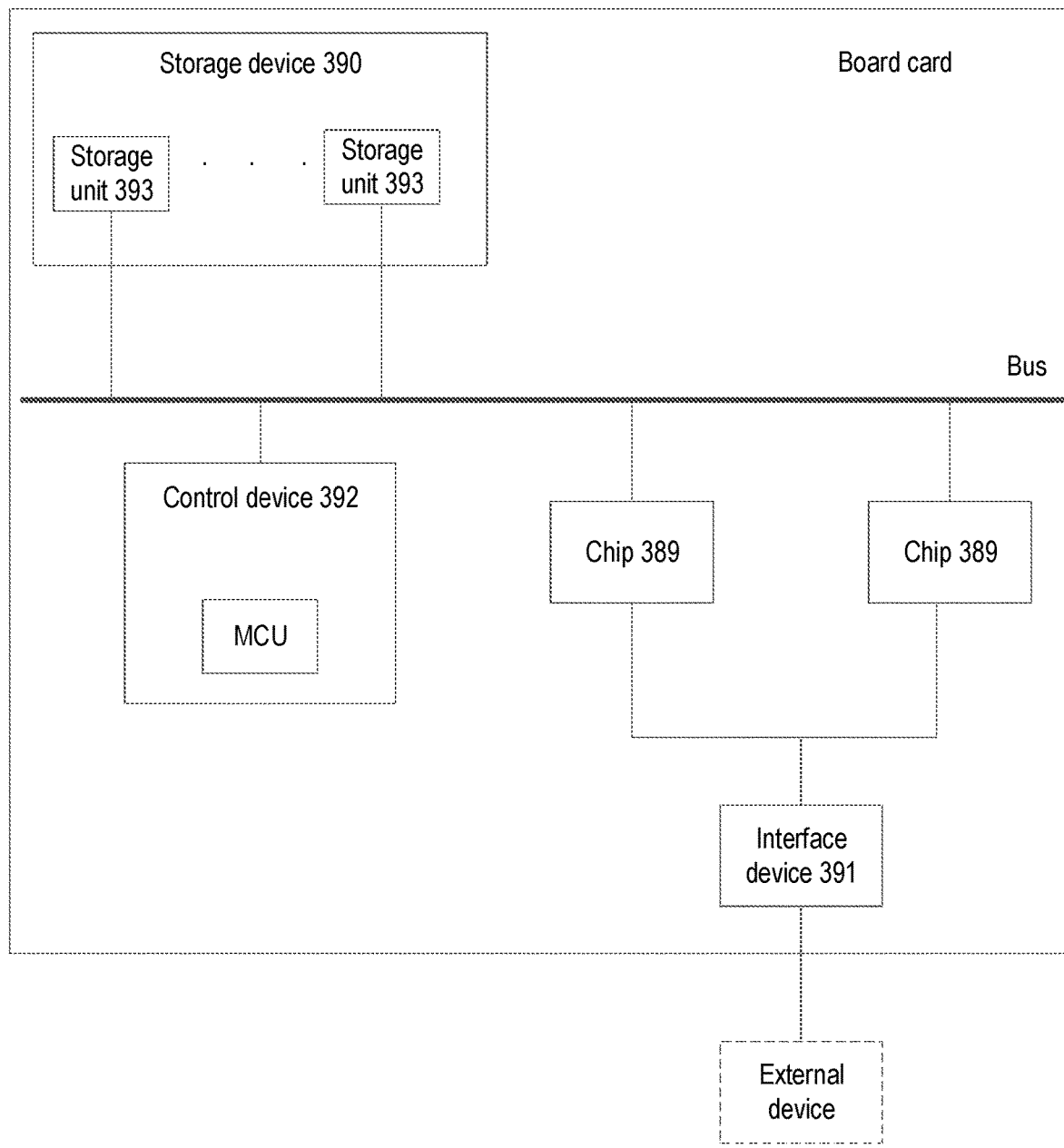
FIG. 24 is a schematic structural diagram of a board card according to an embodiment.

In some embodiments, the present disclosure provides a board card which includes the above chip package structure. FIG. 24 shows a board card which includes the above chip 389 and other supporting components, where the supporting components include and are not limited to: a storage device 390, an interface device 391, and a control device 392;

the storage device 390 is connected to the chip in the chip package structure through a bus for storing data. The storage device may include a plurality of clusters of storage units 393. Each cluster of the storage units is connected to the chip through a bus. It may be understood that each cluster of the storage units may be DDR SDRAMs (Double Data Rate Synchronous Dynamic Random Access Memory).

DDR may double the speed of SDRAM without increasing a clock frequency. DDR allows data to be read on rising and falling edges of a clock pulse. A speed of DDR is twice that of standard SDRAM. In an embodiment, the storage device may include four clusters of the storage units. Each cluster of the storage units may include a plurality of DDR4 particles (chips). In an embodiment, the chip may include four 72-bit DDR4 controllers, where 64 bits in the 72-bit DDR4 controller are used for data transfer and 8 bits are used for ECC verification. It may be understood that when DDR4-31200 particles are used in each cluster of the storage units, a theoretical bandwidth of data transfer may reach 251600 MB/s.

In an embodiment, each cluster of the storage units includes a plurality of DDR SDRAMs arranged in parallel. DDR may transfer data twice in one clock cycle. A controller for controlling the DDR is arranged in the chip to control data transfer and data storage of each storage unit.

The interface device is electrically connected to the chip in the chip package structure. The interface device is configured to implement data transfer between the chip and an external device (such as a server or a computer). For example, in an embodiment, the interface device may be a standard PCIE interface. For example, data to be processed is transferred from the server to the chip through a standard PCIE interface to realize data transfer. Optionally, when a PCIE 3.0×16 interface is used for transfer, a theoretical bandwidth may reach 116000 MB/s. In another embodiment, the interface device may also be other interfaces. A specific representation of the other interfaces is not limited herein, as long as the interface unit can realize a switching function. In addition, a computation result of the chip is still sent back to the external device (such as a server) by the interface device.

The control device is electronically connected to the chip. The control device is configured to monitor a state of the chip. Specifically, the chip and the control device may be electrically connected through an SPI interface. The control device may include a micro controller unit (MCU). For example, the chip may include a plurality of processing chips, processing cores, or processing circuits, and may drive a plurality of loads. Therefore, the chip can be in different working states such as multi-load and light-load. The control device may realize regulation and control of working states of a plurality of processing chips, processing cores and/or processing circuits in the chip.

In some embodiments, the present disclosure provides an electronic device which includes the above board card.

The electronic device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

Figure 25:
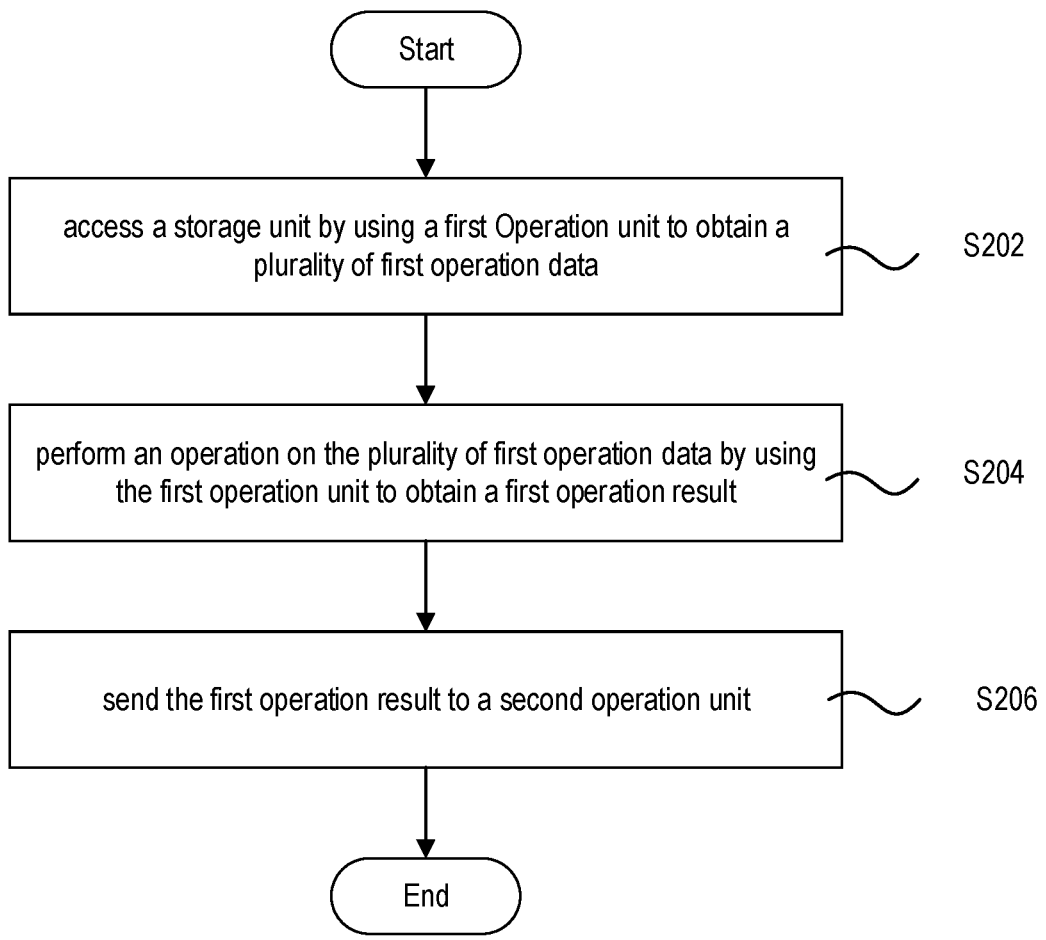
FIG. 25 is a flowchart of an NoC data processing method according to an embodiment.

In an embodiment, as shown in FIG. 25, the present disclosure provides an NoC data processing method, where the method includes:
 a step 202, accessing a storage device by using a first computation device to obtain first operation data.

The first computation device includes a computation unit and a controller unit, where the computation unit includes a primary processing circuit and a plurality of secondary processing circuits. Specifically, the controller unit in the first computation device obtains the first operation data and a computation instruction from the storage device.

The method further includes a step 204, performing an operation on the first operation data by using the first computation device to obtain a first operation result;
 specifically, the step includes performing an operation according to a corresponding computation instruction on the first operation data read from the storage device in the first computation device to obtain the first operation result.

The method further includes a step 206, sending the first operation result to a second computation device;
 specifically, the step includes sending, by the first computation device, the first operation result to the second computation device by using the controller unit in the first computation device through a communication channel established between the first computation device and the second computation device. Optionally, the first operation result may be sent to the second computation device or the storage device.

Further, the NoC data processing method provided in this embodiment may be applied to any NoC processing system shown in FIGS. 1-5.

The above NoC data processing method may realize data transfer among a plurality of computation devices by sending the first operation result in the first computation device to the second computation device; at the same time, by multiplexing operation data, large bandwidth overhead caused by the computation device's multiple accesses to the storage device may be avoided; the method may make reasonable use of operation data and intermediate operation results, and improve the efficiency of data processing.

Figure 26:
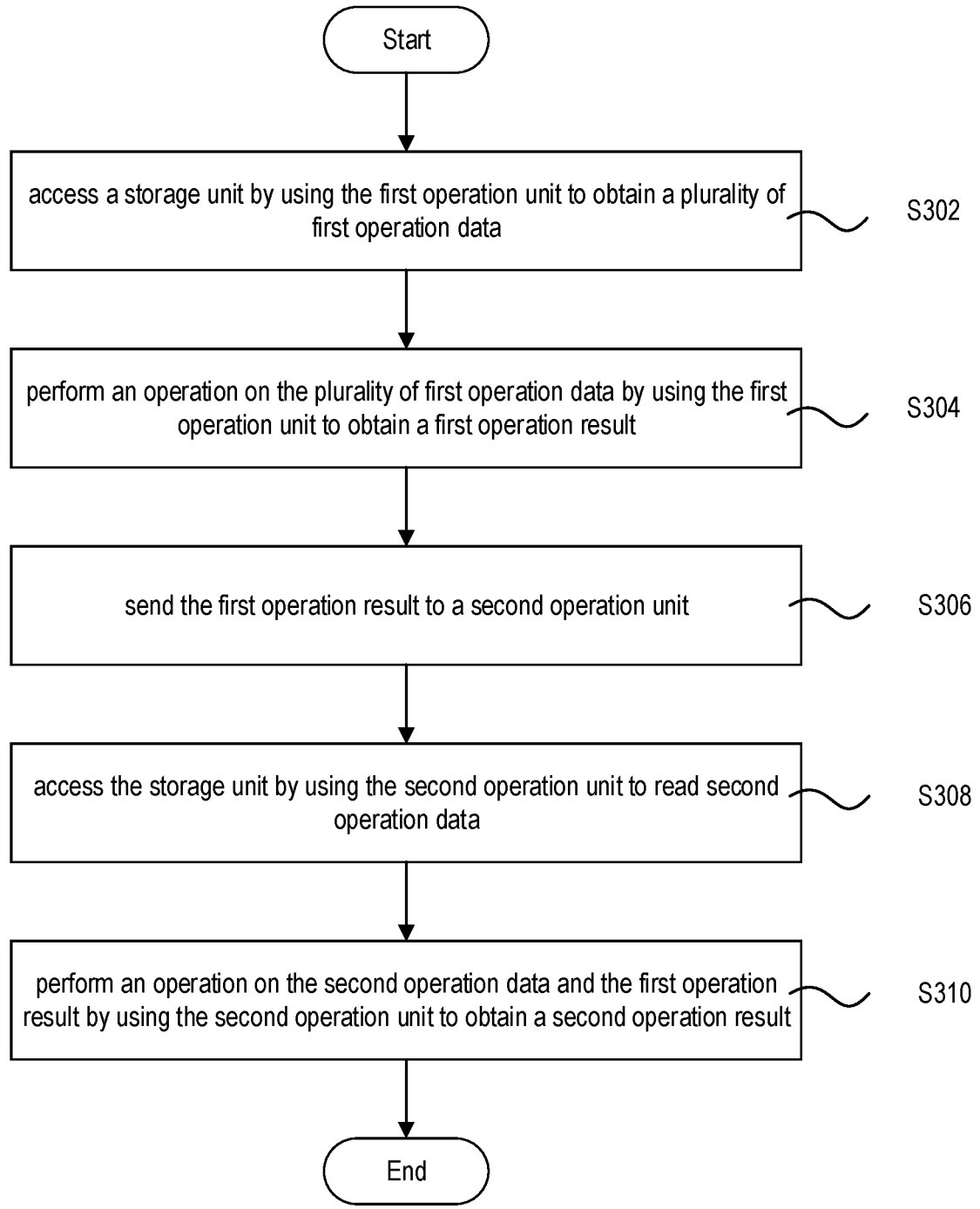
FIG. 26 is a flowchart of an NoC data processing method according to another embodiment.

In an embodiment, as shown in FIG. 26, the present disclosure provides an NoC data processing method, where the method includes: a step 302, accessing a storage device by using a first computation device to obtain first operation data.

The first computation device includes a computation unit and a controller unit, where the computation unit includes a primary processing circuit and a plurality of secondary processing circuits. Specifically, the controller unit in the first computation device obtains first operation data and a computation instruction from the storage device.

The method further includes a step 304, performing an operation on the first operation data by using the first computation device to obtain a first operation result.

Specifically, the step includes performing an operation according to a corresponding computation instruction on the first operation data read from the storage device in the first computation device to obtain the first operation result.

The method further includes a step 306, sending the first operation result to a second computation device;
 specifically, the step includes sending, by the first computation device, the first operation result to the second computation device by using the controller unit in the first computation device through a communication channel established between the first computation device and the second computation device.

The method further includes a step 308, accessing the storage device by using the second computation device to obtain second operation data.

The second computation device includes a computation unit and a controller unit, where the computation unit includes a primary processing circuit and a plurality of secondary processing circuits. Specifically, the controller unit in the second computation device obtains second operation data and a computation instruction from the storage device.

The method further includes a step 310, performing an operation on the second operation data and the first operation result by using the second computation device to obtain a second operation result;
 specifically, the step includes performing an operation according to a corresponding computation instruction on the second operation data read from the storage device and the first operation result received from the first computation device in the first computation device to obtain the second operation result.

Further, the NoC data processing method provided in this embodiment may be applied to any NoC processing system shown in FIGS. 1-5.

The above NoC data processing method may realize multiplexing of operation data by sending the first operation result in the first computation device to the second computation device and the second computation device using the first operation result to perform an operation again; the method may make reasonable use of operation data and intermediate operation results, and improve the efficiency of data processing.

In an embodiment, the NoC data processing method shown in FIG. 26 is applied to the NoC processing system 1900 shown in FIG. 9, where the computation devices 1902 to 1905 are all connected to the storage device 1901 in the same NoC processing module, and any two computation devices 1902 to 1905 are directly connected to each other.

For example, in a matrix multiplication, a matrix A is $$\begin{matrix} a_{00} & a_{01} \\ a_{10} & a_{11} \end{matrix},$$

a matrix B is $$\begin{matrix} b_{00} & b_{01} \\ b_{10} & b_{11} \end{matrix},$$

then a matrix C is A*B=

$$B = \begin{matrix} c_{00} & c_{01} \\ c_{10} & c_{11} \end{matrix},$$

where $c_{00}=a_{00}*b_{00}+a_{01}*b_{10};$ $c_{01}=a_{00}*b_{01}+a_{01}*b_{11};$ $c_{10}=a_{10}*b_{00}+a_{11}*b_{10};$ and $c_{11}=a_{10}*b_{01}+a_{11}*b_{11}.$ First, time is divided into three time periods.

Then, in a first time period, the computation device 1902 to the computation device 1905 simultaneously access the storage device 1901 in the NoC processing module where the computation devices are located.

Specifically, the computation device 1902 reads first operation data $a_{00}$ and $b_{00}$ from the storage device 1901; the computation device 1903 reads first operation data $a_{01}$ and $b_{11}$ from the storage device 1901; the computation device 1904 reads first operation data $a_{11}$ and $b_{10}$ from the storage device 1901; and the computation device 1905 reads first operation data $a_{10}$ and $b_{01}$ from the storage device 1901.

Further, the computation device 1902 performs an operation on the read first operation data $a_{00}$ and $b_{00}$ to obtain a first operation result $a_{00}*b_{00}$; the computation device 1903 performs an operation on the read first operation data $a_{01}$ and $b_{11}$ to obtain a first operation result $a_{01}*b_{11}$; the computation device 1904 performs an operation on the read first operation data $a_{11}$ and $b_{10}$ to obtain a first operation result $a_{11}*b_{10}$; the computation device 1905 performs an operation on the read first operation data $a_{10}$ and $b_{01}$ to obtain a first operation result $a_{10}*b_{01}$.

Then, in a second time period, the computation device 1902 reads the first operation data $a_{01}$ from the computation device 1903 and reads first operation data $b_{10}$ from the computation device 1904 to obtain the second operation result $a_{00}$ through operation; the computation device 1903 reads the first operation data $a_{00}$ from the computation device 1902 and reads first operation data $b_{01}$ from the computation device 1905 to obtain the second operation result $a_{00}*b_{01}$ through operation; the computation device 1904 reads the first operation data $a_{10}$ from the computation device 1905 and reads first operation data $b_{00}$ from the computation device 1902 to obtain the second operation result $a_{10}*b_{00}$ through operation; and the computation device 1905 reads the first operation data $a_{11}$ from the computation device 1904 and reads first operation data $b_{11}$ from the computation device 1903 to obtain the second operation result $a_{11}*b_{11}$ through operation.

In a third time period, the computation device 1902 performs an operation on the first operation result $a_{00}*b_{00}$ and the second operation result $a_{01}*b_{10}$ to obtain a third operation result $c_{00}=a_{00}*b_{00}+a_{01}*b_{10}$, and sends the third operation result $c_{00}$ to the storage device 1902; the computation device 1903 performs an operation on the first operation result $a_{01}*b_{11}$ and the second operation result $a_{00}*b_{01}$ to obtain a third operation result $c_{01}=a_{00}*b_{01}+a_{01}*b_{11}$, and sends the third operation result $c_{01}$ to the storage device 1902; the computation device 1904 performs an operation on the first operation result $a_{11}*b_{10}$ and the second operation result $a_{10}*b_{00}$ to obtain a third operation result $c_{10}=a_{10}*b_{00}+a_{11}*b_{10}$, and sends the third operation result $c_{10}$ to the storage device 1902; the computation device 1905 performs an operation on the first operation result $a_{10}*b_{01}$ and the second operation result $a_{11}*b_{11}$ to obtain a third operation result $c_{11}=a_{10}*b_{01}*b_{11}$, and sends the third operation result $c_{11}$ to the storage device 1902.

Figure 27:
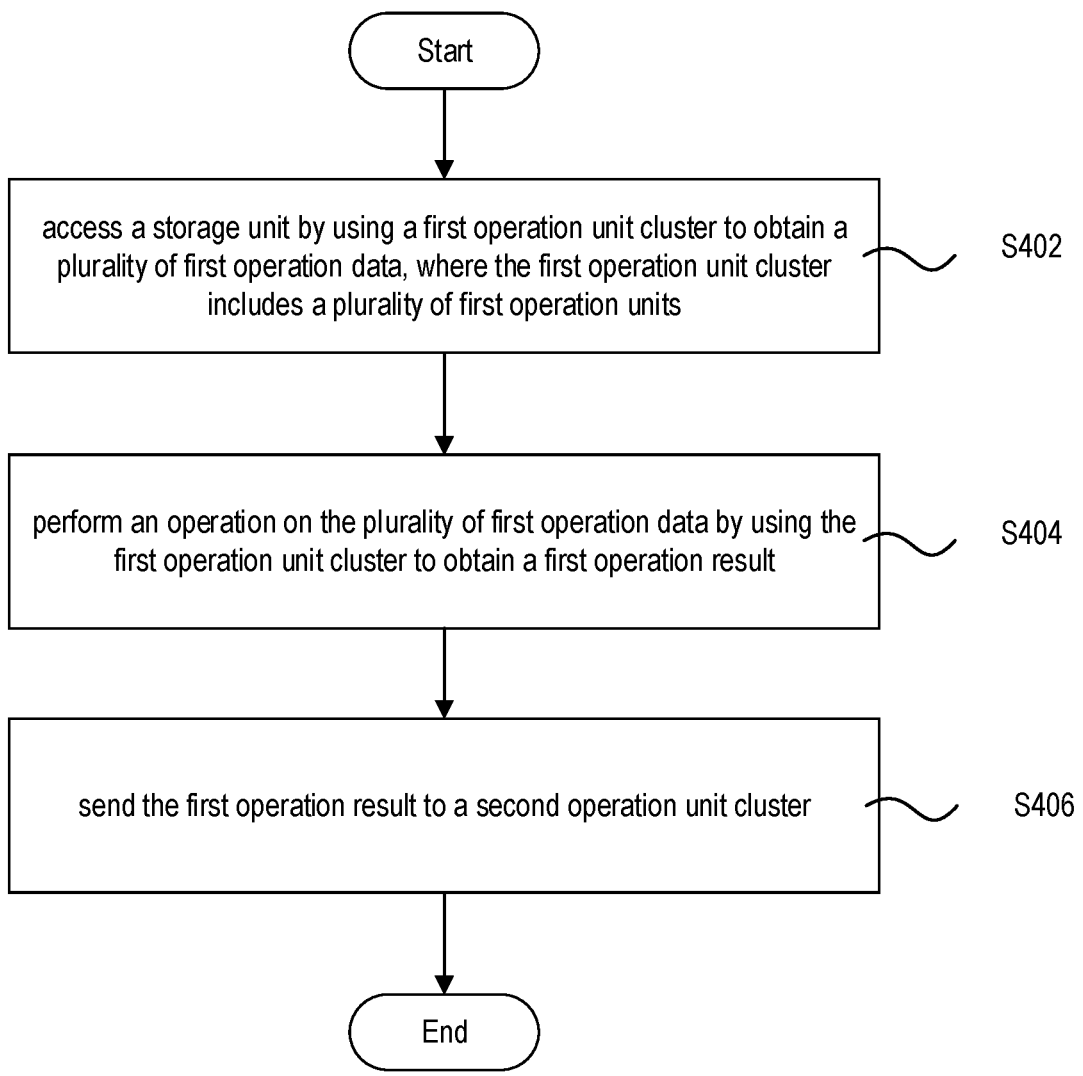
FIG. 27 is a flowchart of an NoC data processing method according to another embodiment.

In an embodiment, as shown in FIG. 27, the present disclosure provides an NoC data processing method, where the method includes:

a step 402, accessing a storage device by using a first computation device cluster to obtain first operation data, where the first operation device cluster includes a plurality of first computation devices.

Each first computation device of the first computation device cluster (cluster1) includes an operation unit and a controller unit, where the operation unit includes a primary processing circuit and a plurality of secondary processing circuits. Specifically, the controller unit in cluster1 obtains first operation data and a computation instruction from the storage device.

Optionally, a plurality of first computation devices in cluster1 simultaneously access the storage device, and each first computation device reads part of data required by cluster1 from the storage device, and the data are transferred in cluster1. Optionally, one or more first computation devices in the cluster1 may be designated to access the storage device, and remaining first computation devices may only perform intra-cluster communication.

The method further includes a step 404, performing an operation on the plurality of first operation data by using the first computation device cluster to obtain a first operation result;

specifically, the step includes: operating and forwarding the plurality of operation data among the plurality of first computation devices according to a corresponding computation instruction to obtain the first operation result.

The method further includes a step 406, sending the first operation result to a second computation device cluster;

specifically, the step includes sending, by cluster1, the first operation result to cluster2 by using the controller unit in cluster1 through a communication channel established between cluster1 and cluster2.

Optionally, the first operation result may be sent to cluster2 or the storage device. Optionally, the first operation result is sent to cluster2 through any first computation device in cluster1 which has established a communication channel with cluster2. Optionally, cluster1 may send the first operation result to any second computation device in cluster2 which has established a communication channel with cluster1.

Further, the NoC data processing method provided in this embodiment may be applied to any NoC processing system shown in FIGS. 6-8.

The above NoC data processing method may realize intra-cluster communication and inter-cluster data transfer among a plurality of computation device clusters; the method may make reasonable use of operation data and intermediate operation results, and improve the efficiency of data processing.

Figure 28:
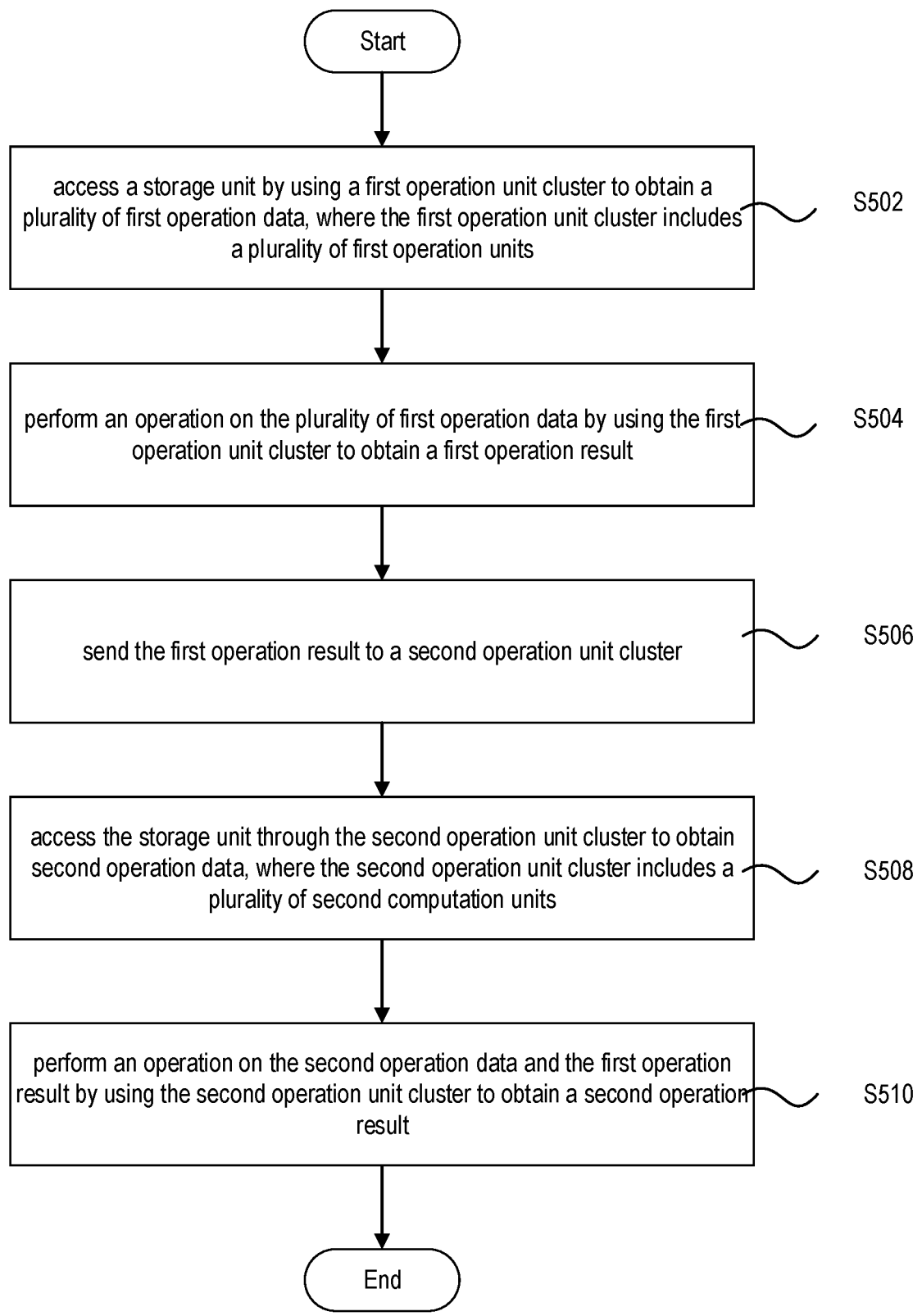
FIG. 28 is a flowchart of an NoC data processing method according to another embodiment.

In an embodiment, as shown in FIG. 28, the present disclosure provides an NoC data processing method, where the method includes:

a step 502, accessing a storage device by using a first computation device cluster to obtain first operation data, where the first operation device cluster includes a plurality of first computation devices.

Each first computation device of the first computation device cluster (cluster1) includes an operation unit and a controller unit, where the operation unit includes a primary processing circuit and a plurality of secondary processing circuits. Specifically, the controller unit in cluster1 obtains first operation data and a computation instruction from the storage device.

Optionally, a plurality of first computation devices in cluster1 simultaneously access the storage device, and each first computation device reads part of data required by cluster1 from the storage device, and the data are transferred in cluster1. Optionally, one or more first computation devices in the cluster1 may be designated to access the storage device, and remaining first computation devices may only perform intra-cluster communication.

The method further includes a step 504, performing an operation on the plurality of first operation data by using the first computation device cluster to obtain a first operation result;

specifically, the step includes: operating and forwarding the plurality of operation data among the plurality of first computation devices according to a corresponding computation instruction to obtain the first operation result.

The method further includes a step 506, sending the first operation result to a second computation device cluster;

specifically, the step includes sending, by cluster1, the first operation result to cluster2 by using the controller unit in cluster1 through a communication channel established between cluster1 and cluster2.

Optionally, the first operation result is sent to cluster2 through any first computation device in cluster1 which has established a communication channel with cluster2. Optionally, cluster1 may send the first operation result to any second computation device in cluster2 which has established a communication channel with cluster1.

The method further includes a step 508, accessing the storage device through the second computation device cluster to obtain second operation data, where the second operation device cluster includes a plurality of second computation devices.

Each first computation device in cluster2 includes a computation unit and a controller unit, where the computation unit includes a primary processing circuit and a plurality of secondary processing circuits. Specifically, the controller unit in cluster2 obtains the second operation data and a computation instruction from the storage device.

Optionally, a plurality of second computation devices in cluster2 simultaneously access the storage device, and each second computation device reads part of data required by cluster2 from the storage device, and the data are transferred in cluster2. Optionally, one or more second computation devices in cluster2 may access the storage device, and remaining second computation devices may only perform intra-cluster communication.

The method further includes a step 510, performing an operation on the second operation data and the first operation result by using the second computation device cluster to obtain a second operation result;

specifically, the step includes operating and forwarding the second operation data read from the storage device and the first operation result received from the first computation device cluster among a plurality of second computation devices according to a corresponding computation instruction to obtain the second operation result.

Further, the NoC data processing method provided in this embodiment may be applied to any NoC processing system shown in FIGS. 6-8.

The above NoC data processing method may realize multiplexing of operation data by sending the first operation result in the first computation device cluster to the second computation device and the second computation device using the first operation result to perform an operation again; the method may make reasonable use of operation data and intermediate operation results, and improve the efficiency of data processing.

Figure 29:
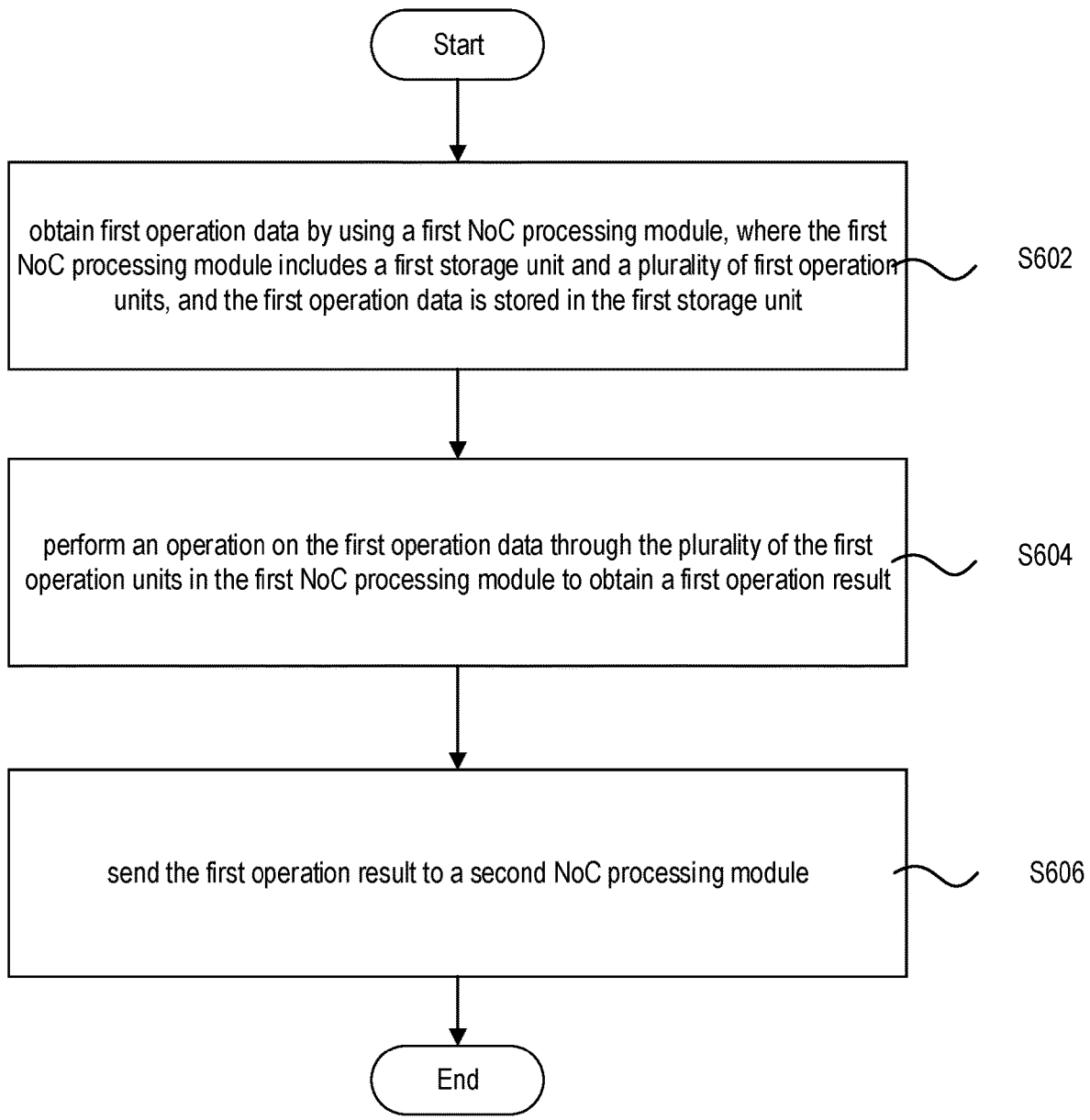
FIG. 29 is a flowchart of an NoC data processing method according to another embodiment.

In an embodiment, as shown in FIG. 29, the present disclosure provides an NoC data processing method, where the method includes: a step 602, obtaining first operation data by using a first NoC processing module, where the first NoC processing module includes a first storage device and a plurality of first computation devices, and the first operation data is stored in the first storage device.

Each first computation device in the first NoC processing module includes an operation unit and a controller unit, where the operation unit includes a primary processing circuit and a plurality of secondary processing circuits. Specifically, the controller unit in the first NoC processing module obtains first operation data and a computation instruction from the first storage device.

Optionally, a plurality of first computation devices in the first NoC processing module simultaneously access the first storage device, and each first computation device reads part of data required by the first NoC processing module from the first storage device, and the data are transferred in the first NoC processing module.

Optionally, one or more first computation devices in the first NoC processing module may access the first storage device, and remaining first computation devices may only perform intra-cluster communication. Specifically, the operation data to be processed by the first NoC processing module is stored in the first storage device.

The method further includes a step 604, performing an operation on the first operation data through the plurality of the first operation devices in the first NoC processing module to obtain a first operation result; and specifically, the step includes: operating and forwarding the plurality of operation data among the plurality of first computation devices according to a corresponding computation instruction to obtain the first operation result.

The method further includes a step 606, sending the first operation result to a second NoC processing module;

specifically, the step includes sending, by the first NoC processing module, the first operation result to the second NoC processing module by using the controller unit in the first NoC processing module through a communication channel established between the first NoC processing module and the second NoC processing module.

Optionally, the first operation result may be sent to the second NoC processing module or the first storage device. Optionally, the first operation result is sent to second NoC processing module through any first computation device in any first NoC processing module which has established a communication channel with the second NoC processing module. Optionally, the first NoC processing module may send the first operation result to any second computation device in the second NoC processing module which has established a communication channel with the first NoC processing module.

Further, the NoC data processing method provided in this embodiment may be applied to any NoC processing system shown in FIGS. 9-12.

The above NoC data processing method may realize intra-module communication and inter-module data transfer among a plurality of NoC processing modules; the method may make reasonable use of operation data and intermediate operation results, and improve the efficiency of data processing.

Figure 30:
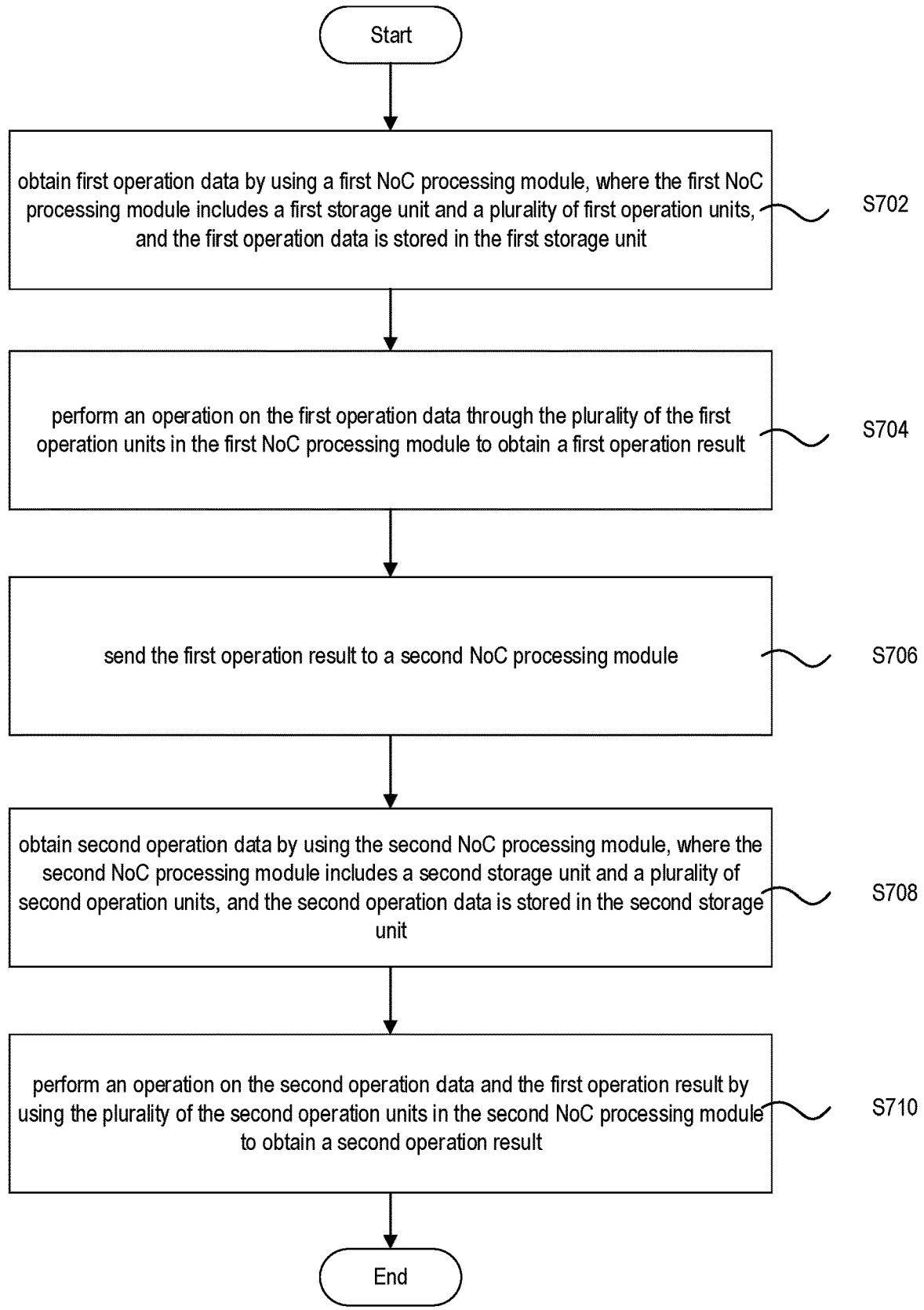
FIG. 30 is a flowchart of an NoC data processing method according to another embodiment.

In an embodiment, as shown in FIG. 30, the present disclosure provides an NoC data processing method, where the method includes:

a step 702, obtaining first operation data by using a first NoC processing module, where the first NoC processing module includes a first storage device and a plurality of first computation devices, and the first operation data is stored in the first storage device.

Each first computation device in the first NoC processing module includes an operation unit and a controller unit, where the operation unit includes a primary processing circuit and a plurality of secondary processing circuits. Specifically, the controller unit in the first NoC processing module obtains first operation data and a computation instruction from the first storage device.

Optionally, a plurality of first computation devices in the first NoC processing module simultaneously access the first storage device, and each first computation device reads part of data required by the first NoC processing module from the first storage device, and the data are transferred in the first NoC processing module.

Optionally, one or more first computation devices in the first NoC processing module may access the first storage device, and remaining first computation devices may only perform intra-cluster communication. Specifically, the operation data to be processed by the first NoC processing module is stored in the first storage device.

The method further includes a step 704, performing an operation on the first operation data through the plurality of the first operation devices in the first NoC processing module to obtain a first operation result; and specifically, the step includes: operating and forwarding the plurality of operation data among the plurality of first computation devices according to a corresponding computation instruction to obtain the first operation result.

The method further includes a step 706, sending the first operation result to a second NoC processing module;

specifically, the step includes sending, by the first NoC processing module, the first operation result to the second NoC processing module by using the controller unit in the first NoC processing module through a communication channel established between the first NoC processing module and the second NoC processing module.

Optionally, the first operation result is sent to second NoC processing module through any first computation device in any first NoC processing module which has established a communication channel with the second NoC processing module. Optionally, the first NoC processing module may send the first operation result to any second computation device in the second NoC processing module which has established a communication channel with the first NoC processing module.

The method further includes: a step 708, obtaining second operation data by using the second NoC processing module, where the second NoC processing module includes a second storage device and a plurality of second computation devices, and the second operation data is stored in the second storage device.

Each second computation device in the second NoC processing module includes an operation unit and a controller unit, where the operation unit includes a primary processing circuit and a plurality of secondary processing circuits. Specifically, the controller unit in the second NoC processing module obtains second operation data and a computation instruction from the second storage device.

Optionally, a plurality of second computation devices in the second NoC processing module simultaneously access the second storage device, and each second computation device reads part of data required by the second NoC processing module from the second storage device, and the data are transferred in the second NoC processing module.

Optionally, one or more second computation devices in the second NoC processing module may access the second storage device, and remaining second computation devices may only perform intra-cluster communication. Specifically, the operation data to be processed by the second NoC processing module is stored in the second storage device.

The method further includes a step 710, performing an operation on the second operation data and the first operation result by using the plurality of the second computation devices in the second NoC processing module to obtain a second operation result.

The step 710 specifically includes:

a step 7102, operating the second operation data and the first operation result among the plurality of the second computation devices to obtain the second operation result;

specifically, the step includes performing, by each second computation device, an operation on the second operation data and the first operation result according to a corresponding computation instruction to obtain a plurality of intermediate results, and performing an operation on the plurality of intermediate results to obtain the second operation result.

The step 7210 further includes a step 7104, storing the second operation result in the second storage device.

Further, the NoC data processing method provided in this embodiment may be applied to any NoC processing system shown in FIGS. 9-12.

The above NoC data processing method may realize multiplexing of operation data by sending the first operation result in the first NoC processing system to the second NoC processing system and the second NoC processing system using the first operation result to perform an operation again; the method may make reasonable use of operation data and intermediate operation results, and improve the efficiency of data processing.

The NoC processing method in the embodiments of the present disclosure may be used for machine learning computations, and specifically, be used for artificial neural network operations. Operation data in the NoC processing system may specifically include: input neuron data and weight data; and an operation result in the NoC processing system may specifically be: a result of the artificial neural network operation, which is output neuron data.

An operation in a neural network may be an operation of one layer of the neural network. For a multi-layer neural network, an implementation of the operation may be that, in a forward operation, after the operation of a previous layer of an artificial neural network is completed, an operation instruction of a next layer is performed by using an output neuron obtained by an operation unit as an input neuron of the next layer for operation (or some operations are performed on the output neuron before the output neuron serves as the input neuron of the next layer), and at the same time, a weight is replaced with a weight of the next layer; in a backward operation, after the back operation of a previous layer of the artificial neural network is completed, an operation instruction of a next layer is performed by using an input neuron gradient obtained by an operation unit as an output neuron gradient of the next layer for operation (or some operations are performed on the input neuron gradient before the input neuron gradient serves as the output neuron gradient of the next layer), and at the same time, a weight is replaced with a weight of the next layer.

The above machine learning computations may also include a support vector machine operation, a k-nearest neighbor (k-nn) operation, a k-means operation, a principal component analysis operation and the like. For the convenience of description, an artificial neural network operation are described below as an example to illustrate the specific solution of a machine learning operation.

For an artificial neural network operation, if the artificial neural network operation is a multi-layer operation, input neurons and output neurons of the multi-layer operation do not refer to neurons in an input layer and in an output layer of the entire neural network. For any two adjacent layers in the network, neurons in a lower layer of the network forward operation are the input neurons, and neurons in an upper layer of the network forward operation are the output neurons. For example, in a convolution neural network, if the convolution neural network has L layers, where K=1, 2, . . . L−1, for a $K^{th}$ layer and a $K^{th}$ layer is regarded as an input layer and neurons of the layer are the input neurons, the K+$1^{th}$ layer is regarded as an output layer and neurons of the layer are the output neurons. In other words, except a top layer, each layer may be an input layer, and a lower layer of that layer is a corresponding output layer.

In an optional embodiment, for a fully connected operation of neural network operations, a process may be: y=f(wx+b), where x is an input neuron matrix, w is a weight matrix, b is a bias scalar, f is an activation function which may be any of sigmoid, tanh, relu, and softmax function. It is assumed that there is a binary tree structure with 8 secondary processing circuits, then an implementation method may be:

obtaining, by the controller unit, the input neuron matrix x, the weight matrix w, and a fully connected operation instruction from the storage unit, and transferring the input neuron matrix x, the weight matrix w, and the fully connected operation instruction to the primary processing circuit;

determining, by the primary processing circuit, the input neuron matrix x as broadcast data, determining the weight matrix w as distribution data, partitioning the weight matrix w into 8 sub-matrices, transferring the 8 sub-matrices to the 8 secondary processing circuits through the tree module, and broadcasting the input neuron matrix x to the 8 secondary processing circuits;

multiplying and accumulating, by the secondary processing circuits, the 8 sub-matrices and the input neuron matrix x to obtain 8 intermediate results, and transferring the 8 intermediate results to the primary processing circuit; and sorting, by the primary processing circuit, the 8 intermediate results to obtain an operation result of wx, performing a bias b operation and then performing an activation operation on the operation result to obtain a final result y, sending the final result y to the controller unit; and outputting, by the controller unit, the final result y, or storing the final result y in the storage unit.

A method of performing a neural network forward operation instruction by the computation device shown in FIG. 1 may include:

fetching, by the controller unit, a neural network forward operation instruction, an operation field and at least one opcode corresponding to the neural network operation instruction from the instruction storage unit; transferring, by the controller unit, the operation field to a data access unit, and transferring the at least one opcode to the operation unit;

fetching, by the controller unit, a weight w and a bias b corresponding to the operation field from the storage unit (if b is 0, there is no need to fetch the bias b), transferring the weight w and the bias b to the primary processing circuit of the operation unit; fetching, by the controller unit, input data Xi from the storage unit, and transferring the input data Xi to the primary processing circuit;

determining, by the primary processing circuit, an operation as multiplication according to the at least one opcode, determining the input data Xi as data for broadcasting, determining the weight data as data for distribution, and partitioning the weight w into n data blocks; and determining, by the instruction processing unit of the controller unit, a multiplication instruction, a bias instruction, and an accumulation instruction according to the at least one opcode, sending the multiplication instruction, the bias instruction, and the accumulation instruction to the primary processing circuit; broadcasting, by the primary processing circuit, the multiplication instruction and the input data Xi to the plurality of secondary processing circuits, and distributing the n data blocks to the plurality of secondary processing circuits (for instance, if there are n secondary processing circuits, each secondary processing circuit receives one data block); performing, by the plurality of secondary processing circuits, multiplication on the input data Xi and the received data blocks according to the multiplication instruction to obtain intermediate results, sending the intermediate result to the primary processing circuit; accumulating, by the primary processing circuit, the intermediate results sent from the plurality of secondary processing circuits according to the accumulation instruction to obtain an accumulation result, adding the bias b to the accumulation result according to the bias instruction to obtain a final result, and sending the final result to the controller unit.

In addition, the order of addition and multiplication can be reversed.

The technical solution provided in the present disclosure may realize multiplication operations and bias operations of neural networks through an instruction (a neural network operation instruction). There is no need to store or fetch intermediate data of neural network operations. The technical solution may reduce the storing and fetching operations of intermediate data, and may have technical effects of reducing a corresponding operation step and improving outcomes of neural network operations.

It should be understood that identical or similar parts in the above embodiments may be referred to each other, and for contents not described in detail in some embodiments, please refer to the identical or similar contents in other embodiments.

It should be noted that in the descriptions of the present disclosure, the terms "first", second, etc., are only used for descriptive purposes, and should not be understood as indicating or implying relative importance. In addition, in the description of the present disclosure, unless otherwise specified, the word "plurality" means "at least two".

It should be understood that any process or method description in the flowchart or described in other ways herein represents one or more modules, segments, or parts of codes of executable instructions configured to implement specific logical functions or steps of the process. In addition, the scope of optional implementations of the present disclosure includes additional implementations, and the functions can be implemented in an order not shown or discussed in the present disclosure, or in a substantially simultaneous manner, or in a reverse order according to the functions involved, which should be understood by those skilled in the art to which the embodiments of this present disclosure belong.

It should be understood that each part of the present disclosure can be implemented by hardware, software, firmware, or a combination thereof. In the above implementations, a plurality of steps or methods can be implemented by using software or firmware stored in a memory and executed by a suitable instruction execution system. For example, if hardware is used for implementation, as in another implementation, the steps can be implemented by any one or more of the following technologies known in the art: a discrete logic circuit with a logic gate circuit configured to implement logic functions on data signals, an application-specific integrated circuit with a suitable combinational logic gate circuit, a programmable gate array (PGA), a field-programmable gate array (FPGA), and the like.

Those of ordinary skill in the art can understand that the entire or part of the flow in the methods as stated in the embodiments can be implemented by a program instructing related hardware, wherein the program may be stored in a computer readable storage medium and may include one or more of the methods as stated in the embodiments during execution.

In addition, the functional units in each example of the present application may be integrated into one processing module, or each of the units may exist separately and physically, or two or more units may be integrated into one module. The integrated module above may be implemented in the form of hardware or software function module. When the integrated module is implemented in the form of a software function module and sold or used as an independent product, the module may be stored in a computer-readable storage medium.

The storage medium may be a read-only memory, a disk, a compact disc, etc.

The term "an embodiment", "some embodiments", "example", "specific example", "some examples", or the like referred to herein means that particular features, structures, materials, or characteristics described in conjunction with the embodiment or the example may be contained in at least one embodiment or example of the present disclosure. In the specification, the schematic descriptions of the above terms do not necessarily refer to the same embodiment or example. In addition, the described specific features, structures, materials, or characteristics can be combined in any one or more embodiments or examples in a suitable manner.

Although embodiments of the present disclosure have been shown and described above, it should be understood that the above embodiments are only exemplary and not intended to limit the disclosure. Any changes, modifications, replacements, and variants of the embodiments can be made within the scope of the disclosure.

The invention claimed is:

1. A network-on-chip (NoC) data processing method applied to an NoC processing system, wherein the NoC processing system is used to perform a machine learning operation, and includes a storage device and a computation device, and the method includes:
   accessing the storage device in the NoC processing system by using a first computation device in the NoC processing system to obtain first operation data;
   performing an operation on the first operation data by using the first computation device to obtain a first operation result; and
   sending the first operation result to a second computation device in the NoC processing system,
      wherein the computation device includes an operation unit and a controller unit,
      wherein the accessing the storage device in the NoC processing system by using the first computation device in the NoC processing system to obtain first operation data includes obtaining, by the controller unit in the first computation device, the first operation data and a computation instruction from the storage device,
      wherein the operation unit includes: a tree module which includes a root port and a plurality of branch ports, wherein the root port is connected to the primary processing circuit, and each of the plurality of branch ports is connected to one of the plurality of secondary processing circuits, and
      wherein the tree module forwards a data block, a weight, and an operation instruction between the primary processing circuit and the plurality of secondary processing circuits.

2. The method of claim 1, wherein the operation unit includes a primary processing circuit and a plurality of secondary processing circuits,
   the performing an operation on the first operation data by using the first computation device to obtain a first operation result includes:
   parsing, by the controller unit in the first computation device, the computation instruction to obtain a plurality of operation instructions; and sending, by the controller unit in the first computation device, the plurality of operation instructions and the first operation data to the primary processing circuit in the first computation device;
   processing the first operation data by using the primary processing circuit in the first computation device, and sending the data and the operation instructions among the plurality of secondary processing circuits in the first computation device;

performing, by the plurality of secondary processing circuits in the first computation device, intermediate operations in parallel according to the operation data and the operation instructions sent from the primary processing circuit in the first computation device to obtain a plurality of intermediate results, and transferring the plurality of intermediate results to the primary processing circuit in the first computation device; and performing, by the primary processing circuit in the first computation device, subsequent processing on the plurality of intermediate results to obtain the first operation result of the computation instruction.

3. The method of claim 2, wherein the sending the first operation result to a second computation device in the NoC processing system includes:

transferring, by the controller unit in the first computation device, the first operation result to the second computation device in the NoC processing system.

4. The method of claim 2, wherein the machine learning computation includes: an artificial neural network operation, the first operation data includes: input neuron data and weight data, and the first operation result is output neuron data.

5. The method of claim 4, wherein the computation device further includes: a storage unit and a direct memory access unit, and the storage unit includes any combination of a register and a cache, wherein the cache is configured to store the first operation data; and the register is configured to store a scalar in the first operation data.

6. The method of claim 4, wherein the controller unit includes an instruction storage unit, an instruction processing unit, and a storage queue unit, wherein the instruction storage unit stores a computation instruction associated with the artificial neural network operation;

the instruction processing unit parses the computation instruction to obtain a plurality of operation instructions; and the storage queue unit stores an instruction queue, wherein the instruction queue includes: a plurality of operation instructions and/or a computation instruction to be executed in an order of the instruction queue.

7. The method of claim 6, wherein the primary processing circuit includes a dependency processing unit, wherein the dependency processing unit determines whether there is an association between a first operation instruction and a zeroth operation instruction before the first operation instruction; if there is an association between the first operation instruction and the zeroth operation instruction, the dependency processing unit caches the first operation instruction in the instruction storage unit, and after the zeroth operation instruction is executed, the dependency processing unit fetches the first operation instruction from the instruction storage unit and sends the first operation instruction to the operation unit;

the determining whether there is an association between a first operation instruction and a zeroth operation instruction before the first operation instruction includes:

fetching a first storage address interval of data required in the first operation instruction according to the first operation instruction, fetching a zeroth storage address interval of data required in the zeroth operation instruction according to the zeroth operation instruction; if the first storage address interval and the zeroth storage address interval have an overlapping area, determining that there is an association between the first operation instruction and the zeroth operation instruction; and if the first storage address interval and the zeroth storage address interval do not have an overlapping area, determining that there is no association between the first operation instruction and the zeroth operation instruction.

8. The method of claim 4, wherein the operation unit includes one or more branch processing circuits, wherein each branch processing circuit is connected to at least one secondary processing circuit, wherein the primary processing circuit determines that the input neuron is broadcast data, the weight is distribution data, divides the distribution data into a plurality of data blocks, and sends at least one of the plurality of data blocks, the broadcast data, and at least one of the plurality of operation instructions to the branch processing circuit;

the branch processing circuit forwards the data block, the broadcast data, and the operation instruction between the primary processing circuit and the plurality of secondary processing circuits;

the plurality of secondary processing circuits perform an operation on the received data block and broadcast data according to the operation instruction to obtain an intermediate result, and transfer the intermediate result to the branch processing circuit; and the primary processing circuit performs subsequent processing on the intermediate results sent by the branch processing circuit to obtain a first operation result of the computation instruction, and sends the first operation result of the computation instruction to the controller unit.

9. The method of claim 4, wherein the plurality of secondary processing circuits are distributed in an array; each secondary processing circuit is connected to other adjacent secondary processing circuits, and the primary processing circuit is connected to k of the plurality of secondary processing circuits, wherein the K secondary processing circuits are: n secondary processing circuits in a first row, n secondary processing circuits in an $m^{th}$ row, and m secondary processing circuits in a first column, where the k secondary processing circuits forwards data and instructions between the primary processing circuit and the plurality of secondary processing circuits;

the primary processing circuit determines that the input neuron is broadcast data, the weight is distribution data, partitions the distributed data into a plurality of data blocks, and sends at least one of the plurality of data blocks and at least one of the plurality of operation instructions to the k secondary processing circuits;

the k secondary processing circuits convert data between the primary processing circuit and the plurality of secondary processing circuits;

the plurality of secondary processing circuits perform an operation on the received data block according to the operation instruction to obtain an intermediate result, and transfer the operation result to the k secondary processing circuits; and the primary processing circuit performs subsequent processing on the intermediate results sent by the k secondary processing circuits to obtain the first operation result of the computation instruction, and sends the first operation result of the computation instruction to the controller unit.

10. The method of claim 1, wherein
the primary processing circuit combines and sorts the intermediate results sent by the plurality of processing circuits to obtain the first operation result of the computation instruction; and
or the primary processing circuit combines, sorts, and activates the intermediate results sent by the plurality of processing circuits to obtain the first operation result of the computation instruction.

11. The method of claim 1, wherein the primary processing circuit includes: one or more of a conversion processing circuit, an activation processing circuit, and an addition processing circuit, wherein
the conversion processing circuit processes the first operation data, and the process includes: performing conversion between a first data structure and a second data structure on the data or intermediate results received by the primary processing circuit, or performing conversion between a first data type and a second data type on the data or intermediate results received by the primary processing circuit;
the activation processing circuit executes the subsequent processing, which specifically includes performing an activation operation of data in the primary processing circuit; and
the addition processing circuit executes the subsequent processing, which specifically includes performing an addition operation or an accumulation operation.

12. The method of claim 8, wherein the secondary processing circuits include a multiplication processing circuit, wherein
the multiplication processing circuit performs a multiplication operation on a received data block to obtain a product result.

13. The method of claim 12, wherein the secondary processing circuits further include an accumulation processing circuit configured to perform an accumulation operation on the product result to obtain the intermediate result.

14. The method of claim 1, wherein the tree module is an n-ary tree structure, wherein n is an integer greater than or equal to 2.

15. The method of claim 1, further comprising accessing the storage device in the NoC processing system by using the second computation device in the NoC processing system to obtain second operation data.

16. The method of claim 15, further comprising performing an operation on the second operation data and the first operation result by using the plurality of second computation devices in the NoC processing system to obtain a second operation result.

17. An NoC data processing device configured to perform a machine learning operation, comprising:
a first operation data obtaining module configured to access a storage device in the NoC processing system by using a first computation device in the NoC processing system to obtain first operation data;
an operation module configured to perform an operation on the first operation data by using the first computation device to obtain a first operation result; and
a first operation result sending module configured to send the first operation result to a second computation device in the NoC processing system,
wherein the computation device includes an operation unit and a controller unit,
wherein the accessing the storage device in the NoC processing system by using the first computation device in the NoC processing system to obtain first operation data includes obtaining, by the controller unit in the first computation device, the first operation data and a computation instruction from the storage device,
wherein the operation unit includes: a tree module which includes a root port and a plurality of branch ports, wherein the root port is connected to the primary processing circuit, and each of the plurality of branch ports is connected to one of the plurality of secondary processing circuits, and
wherein the tree module forwards a data block, a weight, and an operation instruction between the primary processing circuit and the plurality of secondary processing circuits.

* * * * *